(12) United States Patent
Krishnan et al.

(10) Patent No.: US 7,903,113 B2
(45) Date of Patent: Mar. 8, 2011

(54) SYSTEMS AND METHODS OF IMAGE RENDERING FROM DATASETS

(75) Inventors: Smita Krishnan, Yardley, PA (US); Robert Schneider, Roβtal (DE); Lining Yang, East Windsor, NJ (US); Min Xie, Plainsboro, NJ (US)

(73) Assignees: Siemens Medical Solutions USA, Inc., Malvern, PA (US); Siemens Aktiengesellschaft, Munich (DE)

( * ) Notice: Subject to any disclaimer, the term of this patent is extended or adjusted under 35 U.S.C. 154(b) by 921 days.

(21) Appl. No.: 11/771,329

(22) Filed: Jun. 29, 2007

(65) Prior Publication Data

US 2008/0030500 A1    Feb. 7, 2008

Related U.S. Application Data

(60) Provisional application No. 60/830,984, filed on Jul. 14, 2006.

(51) Int. Cl.
    *G06T 15/00* (2006.01)
(52) U.S. Cl. ......... 345/424; 345/419; 345/420; 345/422; 345/428
(58) Field of Classification Search ............... 345/419, 345/420, 422, 424, 428
    See application file for complete search history.

(56) References Cited

U.S. PATENT DOCUMENTS

| | | | |
|---|---|---|---|
| 6,334,847 B1 | 1/2002 | Fenster et al. | |
| 6,748,347 B1 | 6/2004 | Dalton | |
| 7,085,406 B2 | 8/2006 | Alyassin | |
| 7,242,401 B2 * | 7/2007 | Yang et al. | 345/420 |
| 7,355,598 B2 * | 4/2008 | Yang et al. | 345/420 |
| 2004/0125103 A1 | 7/2004 | Kaufman et al. | |
| 2004/0199064 A1 | 10/2004 | Van Liere et al. | |
| 2005/0285858 A1 | 12/2005 | Yang et al. | |
| 2005/0286748 A1 | 12/2005 | Yang et al. | |
| 2006/0170682 A1 | 8/2006 | Van Liere | |
| 2007/0040833 A1 | 2/2007 | Buyanovski | |

OTHER PUBLICATIONS

Philippe Lacroute, et al., "Fast Volume Rendering Using a Shear-Wrap Factorization of the Viewing Transformation"; Center for Integrated Systems, Stanford University.

Marc Leroy, "Display of Surfaces from Volume Data", Jun. 1987 (revised Feb. 1988); Computer Science Department, University of North Carolina.

Lee Westover, "Footprint Evaluation for Volume Rendering; Numerical Design Limited"; The University of North Carolina at Chapel Hill; Computer Graphics, vol. 24, No. 4, Aug. 1990.

\* cited by examiner

*Primary Examiner* — Phu Nguyen
(74) *Attorney, Agent, or Firm* — Alexander J Burke

(57) ABSTRACT

A system and method for rendering an MIP image that has reduced high frequency component loss and reduced chessboard artifacts. The method includes accessing volumetric data, having random noise. Rays are shot, or cast, through the volumetric data, onto a voxel grid, which has grid points. Sampling data along each ray is performed to obtain selected sample data points on the ray and a distance from a selected point to a nearest grid point is determined. A voxel intensity value is accessed at each selected point, as a function of the position of the selected point relative to the nearest grid point. The difference between the voxel intensity at each selected point is minimized an image is rendered from the volumetric data as a function of the minimizing step. Multiple methods may be used to minimize the difference between the voxel intensity at each selected point. These include for example 1.) applying a localized low pass filter, 2.) applying a localized high order interpolation kernel, and 3.) applying localized distance remapping methods.

60 Claims, 15 Drawing Sheets

SYSTEMS AND METHODS OF IMAGE RENDERING FROM DATASETS

CROSS-REFERENCE TO RELATED APPLICATIONS

This application claims a priority benefit to provisional application Ser. No. 60/830,984, filed on Jul. 14, 2006 and entitled "Method to Generate Chessboard Artifact-Free MIP Image From Low SNR Datasets," which is hereby incorporated by reference in its entirety herein.

BACKGROUND

1. Field of the Invention

This invention relates generally to imaging systems. More specifically, the present invention is directed to systems and methods of image processing in which the high frequency component loss is minimized and artifacts in Maximum Intensity Projection (MIP) images, such as chessboard artifacts, are also minimized.

2. Background Discussion

Medical imaging techniques provide doctors and medical technicians with valuable data for patient diagnosis and care. Various imaging techniques include cardiac angiography, peripheral angiography, radiography, computed tomography and positron emission tomography. All of these imaging techniques produce medical images that are studied by medical personnel. A higher quality image leads to more accurate diagnosis. The images produced by the above-described techniques can be rendered by Maximum Intensity Projection (MIP), which is a widely accepted volume rendering technique.

Radiography is the use of certain spectra of electromagnetic radiation, usually x-rays, to image a human body. Angiography, a particular radiographic method, is the study of blood vessels using x-rays. An angiogram uses a radiopaque substance, or contrast medium, to make the blood vessels visible under x-ray. Angiography is used to detect abnormalities, including narrowing (stenosis) or blockages (occlusions), in the blood vessels throughout the circulatory system and in certain organs.

Cardiac angiography, also known as coronary angiography, is a type of angiographic procedure in which the contrast medium is injected into one of the arteries of the heart, in order to view blood flow through the heart, and to detect obstruction in the coronary arteries, which can lead to a heart attack.

Peripheral angiography, in contrast, is an examination of the peripheral arteries in the body; that is, arteries other than the coronary arteries. The peripheral arteries typically supply blood to the brain, the kidneys, and the legs. Peripheral angiograms are most often performed in order to examine the arteries which supply blood to the head and neck, or the abdomen and legs.

Computed Tomography (CT), originally known as computed axial tomography (CAT or CT scan), is an imaging technique that uses digital geometry processing to generate a three dimensional image of internal features of an object from a series of two-dimensional x-ray images taken around a single axis of rotation. An iodine dye, or other contrast material, may be used to make structures and organs easier to see on the CT picture. The dye may be used to check blood flow, find tumors, and examine other problems.

Positron emission tomography (PET) imaging may also be used. In PET imaging, a short-lived radioactive tracer isotope, which decays by emitting a positron, and which has been chemically incorporated into a metabolically active molecule, is injected into the patient. The radioactive decay of the positrons is measured to generate an image.

When imaging techniques produce images, the images have a dataset of pixels or voxels (described in more detail below) that can be modified to increase the image quality. For example, medical volumetric dataset sizes have been expanding rapidly with the new advanced CT scanners. For example, typical CT machines from Siemens® Medical Solutions can generate a pixel image dataset at a size of 512×512×4096. The capacity to visualize such datasets with high interactivity and high image quality is helpful to medical professionals in diagnosing disease.

As mentioned above, Maximum Intensity Projection (MIP) is a widely accepted volume rendering technique that is used to extract high-intensity structures from volumetric scalar data. At each pixel, the highest sample value encountered along the corresponding viewing ray is determined. MIP is commonly used to extract vascular structures from medical CT or MRI data sets, for example, angiography.

When a volume dataset containing wideband noise is rendered using MIP, the resultant MIP image can show chessboard or stripe like artifacts. Since the noise is wideband in nature, there is no effective method to pre-filter the volume dataset without damaging the signal components and lowering MIP image resolution.

Therefore, it would be an advancement in the state of the art to provide a system and method of generating high quality image data, which is substantially artifact-free.

SUMMARY

Accordingly, the present invention is directed to systems and methods of image processing that generate high quality Chessboard artifact free MIP images.

One embodiment of the present invention is directed to a method for rendering a chessboard artifact free MIP image. This includes shooting rays from every pixel on an image plane through a 3D voxel grid. Intensity values are sampled, using chessboard mitigation algorithms, along each ray with a defined step size. A maximum sample intensity value of each ray is computed. The maximum sample intensity value is stored in the pixel where the ray is cast. The process is continued until all the pixels on the image plane are filled or rendered and an image is then rendered.

Another embodiment of the present invention is directed to the method described above, wherein the step of sampling intensity values using chessboard mitigation algorithms includes determining distances of sampling points from neighboring image plane points. Weighting coefficients are computed as a function of the distances and chessboard mitigation factors so as to minimize differences in noise variance at different sampling positions. The intensity value at the sampling position is interpolated as a function of the neighboring voxel intensity values and the weighting coefficients.

Yet another embodiment of the present invention is directed to the method described above, in which the step of computing weighting coefficients includes controlling the weighting coefficients by regional maximum and/or minimum intensity values.

Yet another embodiment of the present invention is directed to the method described above, and also includes identifying a regional intensity value of each voxel.

Yet another embodiment of the present invention is directed to the method described above, that also includes pre-processing the regional intensity value.

Yet another embodiment of the present invention is directed to the method described above and also includes utilizing an octree structure to store a minimum regional intensity value and a maximum regional intensity value.

Yet another embodiment of the present invention is directed to the method described above, wherein the step of computing weighting coefficients includes controlling the weighting coefficients by the zoom factors $$W = \frac{W_0}{1 + zoomFactor \times M}$$

where, $W_0$ is the weighting function and M is a constant that controls the weighing function depending on the zoom factor.

Yet another embodiment of the present invention is directed to the method described above, and also includes establishing a zoom factor.

Yet another embodiment of the present invention is directed to the method described above, wherein the step of computing weighting coefficients also includes controlling the weighting coefficients by the voxel sizes at each dimension.

Yet another embodiment of the present invention is directed to the method described above, and also includes establishing a voxel dimension value for each voxel, and utilizing the voxel dimension value to normalize the distance at each dimension before computing the weighting coefficients.

Yet another embodiment of the present invention is directed to the method described above, and also includes establishing a render direction and utilizing the render direction in the rendering step.

Yet another embodiment of the present invention is directed to the method described above, wherein the step of computing weighting coefficients also includes low pass filtering selected points that are within a predetermined distance of a voxel grid point.

Yet another embodiment of the present invention is directed to the method described above, wherein the low pass filtering is linear filtering.

Yet another embodiment of the present invention is directed to the method described above, wherein the low pass filtering is non-linear filtering.

Yet another embodiment of the present invention is directed to the method described above, wherein the step of computing weighting coefficients includes applying a localized high order interpolation kernel to at least a portion of the selected points.

Yet another embodiment of the present invention is directed to the method described above, wherein the interpolation kernel comprises tri-cubic interpolation.

Yet another embodiment of the present invention is directed to the method described above, wherein the step of computing weighting coefficients also includes remapping the identified sample position distance from the voxel grid to maintain a minimum distance from the identified sample to the voxel grid. The minimum distance exceeds a predetermined threshold.

Yet another embodiment of the present invention is directed to the method described above, wherein the remapping includes linear distance mapping.

Yet another embodiment of the present invention is directed to the method described above, wherein the remapping includes non-linear distance mapping.

Yet another embodiment of the present invention is directed to the method described above, wherein the remapping includes threshold mapping.

Other embodiments of the present invention include the methods described above but implemented using apparatus or programmed as computer code to be executed by one or more processors operating in conjunction with one or more electronic storage media.

BRIEF DESCRIPTION OF THE DRAWINGS

To the accomplishment of the foregoing and related ends, certain illustrative aspects of the invention are described herein in connection with the following description and the annexed drawings. These aspects are indicative, however, of but a few of the various ways in which the principles of the invention may be employed and the present invention is intended to include all such aspects and their equivalents. Other advantages, embodiments and novel features of the invention may become apparent from the following description of the invention when considered in conjunction with the drawings. The following description, given by way of example, but not intended to limit the invention solely to the specific embodiments described, may best be understood in conjunction with the accompanying drawings, in which.

DETAILED DESCRIPTION OF EXEMPLARY EMBODIMENTS

It is noted that in this disclosure and particularly in the claims and/or paragraphs, terms such as "comprises," "comprised," "comprising," and the like can have the meaning attributed to it in U.S. patent law; that is, they can mean "includes," "included," "including," "including, but not limited to" and the like, and allow for elements not explicitly recited. Terms such as "consisting essentially of" and "consists essentially of" have the meaning ascribed to them in U.S. patent law; that is, they allow for elements not explicitly recited, but exclude elements that are found in the prior art or that affect a basic or novel characteristic of the invention. These and other embodiments are disclosed or are apparent from and encompassed by, the following description. As used in this application, the terms "component" and "system" are intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a server and the server can be a component. One or more components may reside within a process and/or thread of execution and a component may be localized on one computer and/or distributed between two or more computers.

An embodiment of the present invention is directed to using an MIP renderer. Chessboard artifacts, which are observed in Maximum Intensity Projection (MIP) images are significantly reduced. The MIP renderer enables a spatial projection of 3D microscopy data from a desired point of view. The renderer projects, in the visualization plane, the voxels with maximum intensity that are in the way of parallel rays traced from the viewpoint to the plane of projection.

A voxel ("volumetric pixel" or 3-D pixel) is a volume element, representing a value on a regular grid in three dimensional space. Voxels are analogous to pixels, which represent 2-D image data. Voxels are frequently used in the visualization and analysis of medical and scientific data. Voxels are the smallest distinguishable box-shaped part of a 3-D image, which is obtained by multiplying the pixel area by the slice thickness. Some true 3-D displays use voxels to describe their resolution. For example, a display might be able to show 512×512×512 voxels. As with pixels, voxels themselves typically do not contain their position in space (their coordinates); but rather, their coordinates are inferred based on their positions relative to other voxels (i.e., their positions in the data structure that makes up a single volume image). The value of a voxel may represent various properties.

Figure 1:
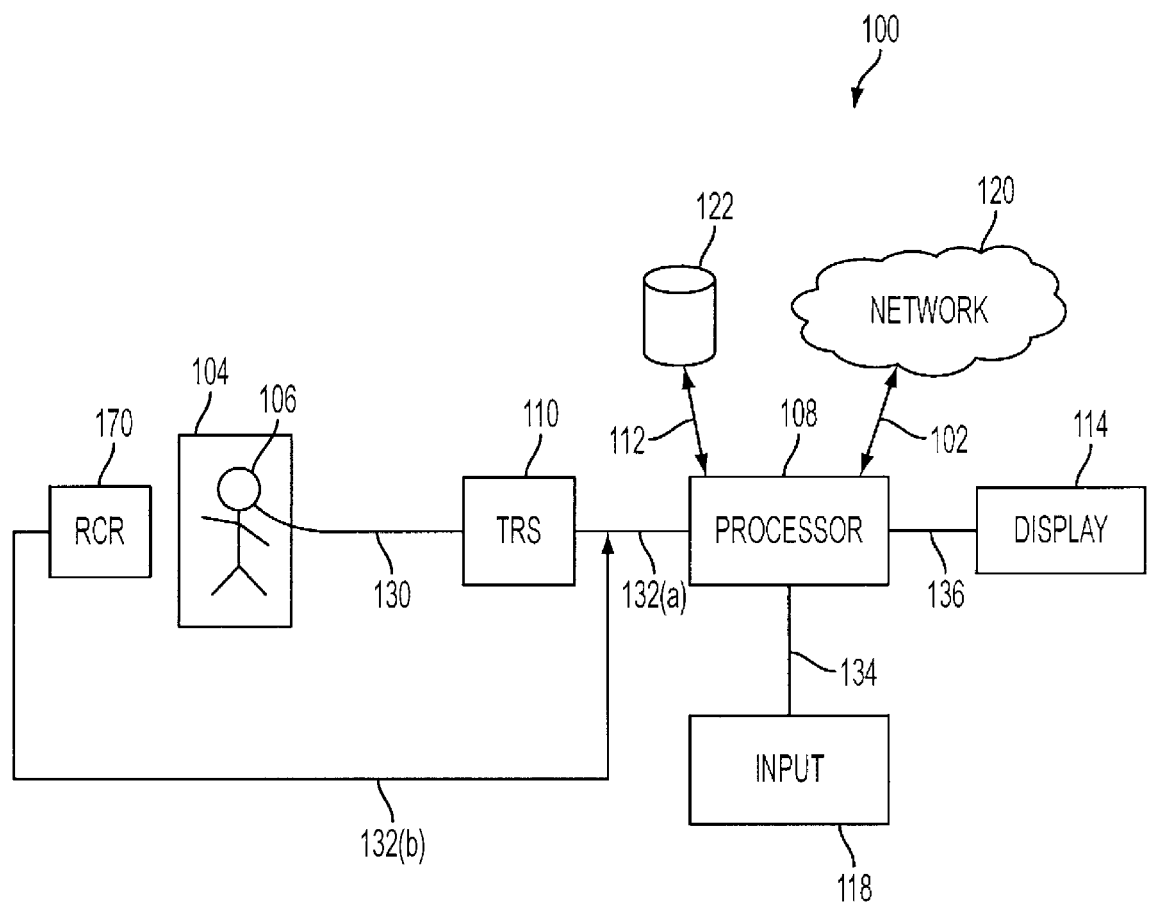
FIG. 1 illustrates a medical imaging system utilizing an embodiment of the present invention.

FIG. 1 shows a medical imaging system 100 utilizing the present invention. Medical imaging system 100 includes a processing device 108, a display module 114, an input module 118, a transmitter module 110, remote storage module 122, network 120, patient 106, examination table 104, and receiver unit 170.

A patient 106 is supported by table 104. Transmitter unit, or module, or emitter unit, or module, 110 and receiver unit, or module, or detection unit, or module, 170 produce image data related to a patient 106. The transmission unit 110 generates imaging medium 130, which may be x-rays, positrons, high-frequency sound waves (ultrasound), or other imaging medium. The transmission unit 110 may be, for example, an x-ray emitting unit, such as an x-ray tube, and receiver unit 170 may be, for example, an x-ray detecting unit, such as an x-ray detector.

In an x-ray embodiment, the emitting unit, or module, 110 is adapted to emit x-rays 130 (identifying a plurality of x-ray signals) and may be, for example, an x-ray producing device that includes a source of electrons, a vacuum within which the electrons are accelerated, and an energy source that causes the electrons to be accelerated. The detection unit, or module, 170 is adapted to absorb and measure the emitted x-rays.

The imaging process may also be implemented using Computed Tomography (CT), originally known as computed axial tomography (CAT or CT scan), which uses digital geometry processing to generate a three dimensional image of internal features of an object from a large series of two-dimensional x-ray images taken around a single axis of rotation. An iodine dye, or other contrast material, may be used to make structures and organs easier to see on the CT pictures. The dye may be used to check blood flow, find tumors, and examine other problems or areas of interest. Positron emission tomography (PET) imaging may also be used. In PET imaging, a short-lived radioactive tracer isotope, which decays by emitting a positron, and which typically has been chemically incorporated into a metabolically active molecule, is injected into the patient. The radioactive decay of positrons is measured to generate an image.

Transmitter unit, or emitting unit, 110 and receiver unit, or detection unit, 170 are coupled to processor unit 108 via communication media 132(*a*) and 132(*b*), respectively, which are used to provide image data to processing unit 108. Communication media 132 (generally) are, for example, a USB bus, IEEE bus or other bi-directional communication medium that is capable of transmitting data, typically representing one or more images in an electronic format.

Processor unit 108 is typically a system control unit that controls the operation of the entire system 100, performs image processing, and transmits the image data for display on the image display unit 114. Processor unit 108 typically includes a CPU and memory to perform the necessary data processing and storage functions for system 100.

Processing unit, or device, or module, or terminal, 108 is typically one or more computers, or other processing device(s), wireless processing device, personal computer (PC), desktop, notebook, information appliance and the like. The processing device typically includes processing and storage modules.

The image display unit, or module, 114 is coupled to processor unit 108 via bi-directional communication medium 136, which is typically a bus or wired connection or wireless connection. The display unit 114 is used to display the image data generated by the system 100. The display unit 114 may be, for example, a monitor, liquid crystal display (LCD), a plasma screen, a graphical user interface (GUI) or other module adapted to display output data typically by a representation of pixels. Input module 118 is coupled to processing unit 108 via bidirectional communication medium 134, which is typically a bus or wired connection or wireless connection. The input module 118 may include devices such as a keyboard, mouse, track ball and/or touch pad or any combination thereof.

The image display module 114 may be coupled to another CPU, processor, or computer, such as a desktop computer, or a laptop computer (not shown), and may also be coupled to a keyboard, a mouse, a track ball, or other input device (not shown) and may also have control mechanisms, such as mechanisms to adjust the view, dimensions, color, font, or display characteristics. The processing module 108 may also be coupled to a printer (not shown) to print the output, or a transmission module, such as a DSL line (not shown) or a modem, such as a wireless modem (not shown), to transmit the output to a second location or another display module. This transmission may also be accomplished using a network, such as the Internet, with web browsing capability, or other network of operatively coupled computers, processors, or output devices. One example of a network is shown in FIG. 1 as element 120.

The network 120 is, for example, any combination of linked computers, or processing devices, adapted to transfer (transmit and/or receive) and process data. The network 120 may include wireless and wired transmission capabilities. The network 120 may be a private Internet Protocol (IP) network, as well as a public IP network, such as the Internet that can utilize World Wide Web (www) browsing functionality. Alternatively the network 120 may be an Ethernet network, or any two or more operatively coupled processing devices that can share information.

An example of a wired network is a network that uses communication busses and MODEMS, or DSL lines, or a local area network (LAN) or a wide area network (WAN) to transmit and receive data between terminals (such as processor 108 and memory 122). An example of a wireless network is a wireless LAN. Global System for Mobile Communication (GSM) is another example of a wireless network. The GSM network is divided into three major systems which are the switching system, the base station system, and the operation and support system (GSM). Also, IEEE 802.11 (Wi-Fi) is a commonly used wireless network in computer systems which enables connection to the Internet or other machines that have Wi-Fi functionality. Wi-Fi networks broadcast radio waves that can be picked up by Wi-Fi receivers that are attached to different computers. As shown in FIG. 1, the network 120 is coupled to processing device 108 via wired or wireless bi-directional communication medium 102.

Memory module 122 is an electronic storage medium, such as a server, or other electronic storage repository that can store data used by system 100. The memory module 122 may include, for example, RAM, ROM, EEPROM or other memory media, such as an optical disk, optical tape, CD, or a floppy disk, a hard disk, or a removable cartridge, on which digital information is stored in the form of bits. The memory module 122 is shown as remote memory coupled to processing module 108 via wired or wireless bi-directional communication medium 112.

Figure 2:
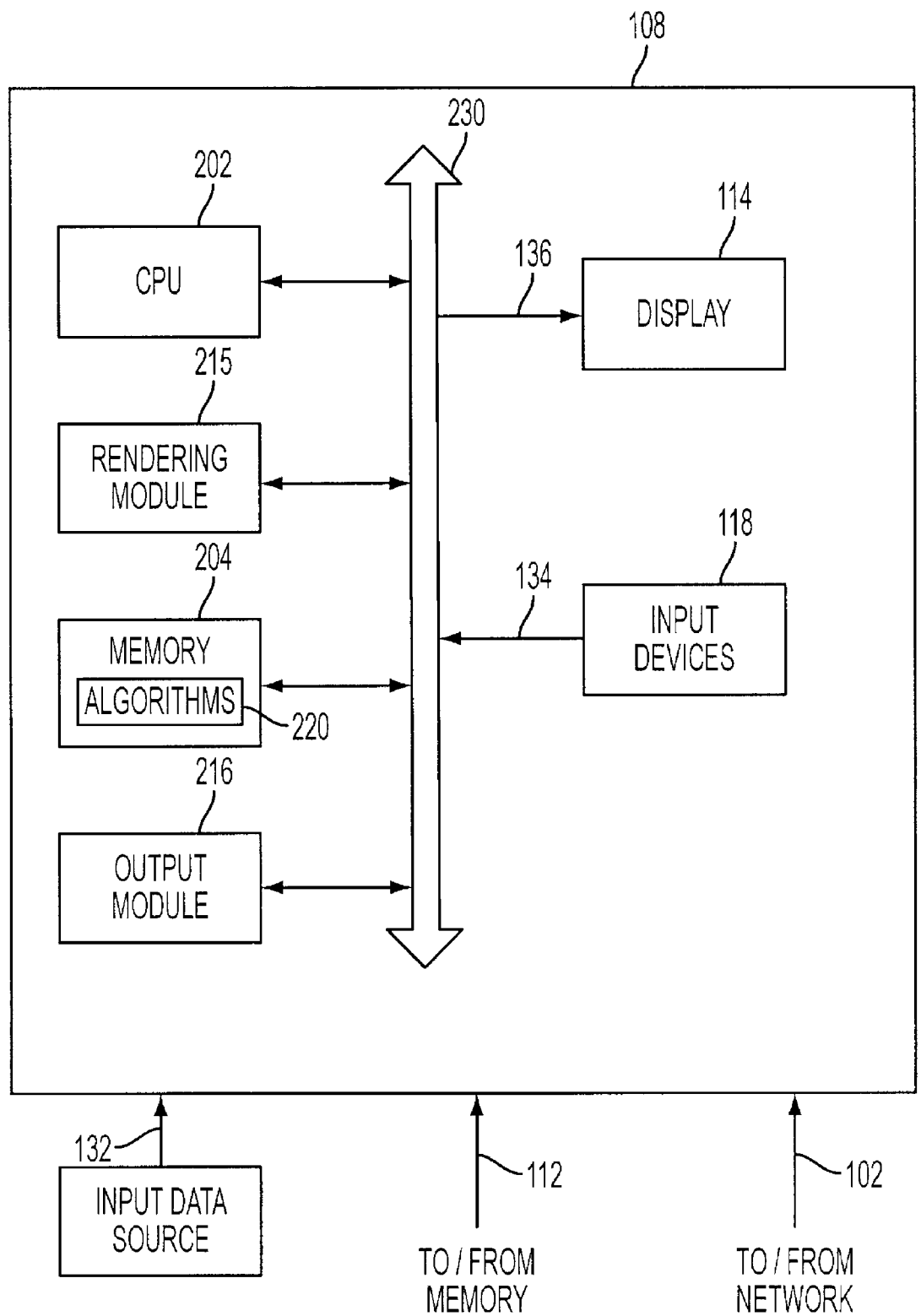
FIG. 2 illustrates a processing apparatus that may be used with an embodiment of the present invention.

FIG. 2 illustrates a processor module 108 that may be used with an embodiment of the present invention. Processor module 108 includes a CPU 202, input/output (I/O) interface 230, memory 204, renderer module 215 and output module 216. Also shown in FIG. 2 are the bi-directional communication media 102, 112 and 132. Display module 114 and input module 118 and associated communication media 136 and 134, respectively, are also shown.

The CPU 202 is typically a processor that includes an arithmetic logic unit (ALU), which performs arithmetic and logical operations, and a control unit (CU), which extracts instructions from memory and decodes and executes them, utilizing the ALU when necessary. I/O interface 230 is used to operatively couple the components of processor module 108.

Memory module 204 is typically an electronic storage medium such as RAM, ROM, EEPROM or other memory device, such as an optical disk, optical tape, CD, or a floppy disk, a hard disk, or a removable cartridge, on which digital information is stored in the form of bits. It may also include recorders to record to and read from mass storage devices such as, for example, optical disks, magnetic disks, flash semiconductor disks, and other types of storage which may be temporary or permanent.

The memory module 204 stores programs, which include, for example, a web browser (not shown), and algorithm memory module 220, as well as typical operating system programs (not shown), input/output programs (not shown), and other programs that facilitate operation of processing device 108.

Memory module, or facility, 204 is used to store image data either received from the detecting unit (shown as element 170 in FIG. 1) or generated by the CPU 202, based on data received from the detecting unit or other source, such as a remote memory (element 122 in FIG. 1), or network (element 120 in FIG. 1). The memory 204 may be accessed in such a way that the contents of the memory are provided to the CPU 202. Once the data has been accessed, typically by program code to fetch, or retrieve, the desired data stored in memory, it may be processed according to one or more algorithms described here.

Algorithm module 220 is used to store algorithms, or series of steps, or program code for determining components of the present invention, such as weighting algorithm, opacity algorithm, transfer function, interpolation algorithm, a variance algorithm, a low pass filtering algorithm and a distance mapping algorithm, and other algorithms to implement the functionality of the present invention (described in more detail herein).

Output module 216 is used to store an output image generated by the algorithms. The output image may be stored, transmitted, printed, displayed or otherwise utilized. The image is typically a 2-D rendering of volumetric data.

Embodiments of the present invention are readily applied, for example, to Maximum Intensity Projection (MIP), which is a display technique that selects the maximum intensity that is encountered along the view angle of the projection. More specifically, a MIP map (sometimes spelled mipmap) is a computer graphics technique used to achieve an illusion of depth in a two-dimensional representation of a three-dimensional (3D) image. An embodiment of the present invention may also be used with x-ray imaging in general, CT imaging, PET imaging, and fluoroscopic imaging, which utilize low dose x-rays per image.

There are several MIP rendering methods, which may be stored in rendering module 215 of FIG. 2, such as shearwarp, splatting and raycasting. Shearwarp is a technique in which the viewing transformation is transformed such that the nearest face of the volume becomes axis aligned with an off-screen image buffer with a fixed scale of voxels to pixels. The volume is then rendered into this buffer using the far more favorable memory alignment and fixed scaling and blending factors. Once all slices of the volume have been rendered, the buffer is then warped into the desired orientation and scale in the displayed image.

The raycast based method produces the best image quality. For every pixel in the output rendered image, a ray is shot into the volume at a certain viewing direction. An interpolation method such as tri-linear interpolation is used to sample the volume along the ray. The maximum sample value along the ray is calculated and stored in the rendered image pixel. This process is repeated until all the rays from every pixel in the output image are cast and the maximum along the rays are calculated.

Although the raycast based method produces high quality MIP images, it may also produce some artifacts when the original volumetric dataset contains wideband noise. These artifacts form a chessboard pattern or stripe like pattern when viewed along one of the volume axis. The width of the chessboard or the stripe changes with the zoom factor. These artifacts often occur in low Signal to Noise Ratio (SNR) MRI or CT volumetric data sets.

Figure 3:
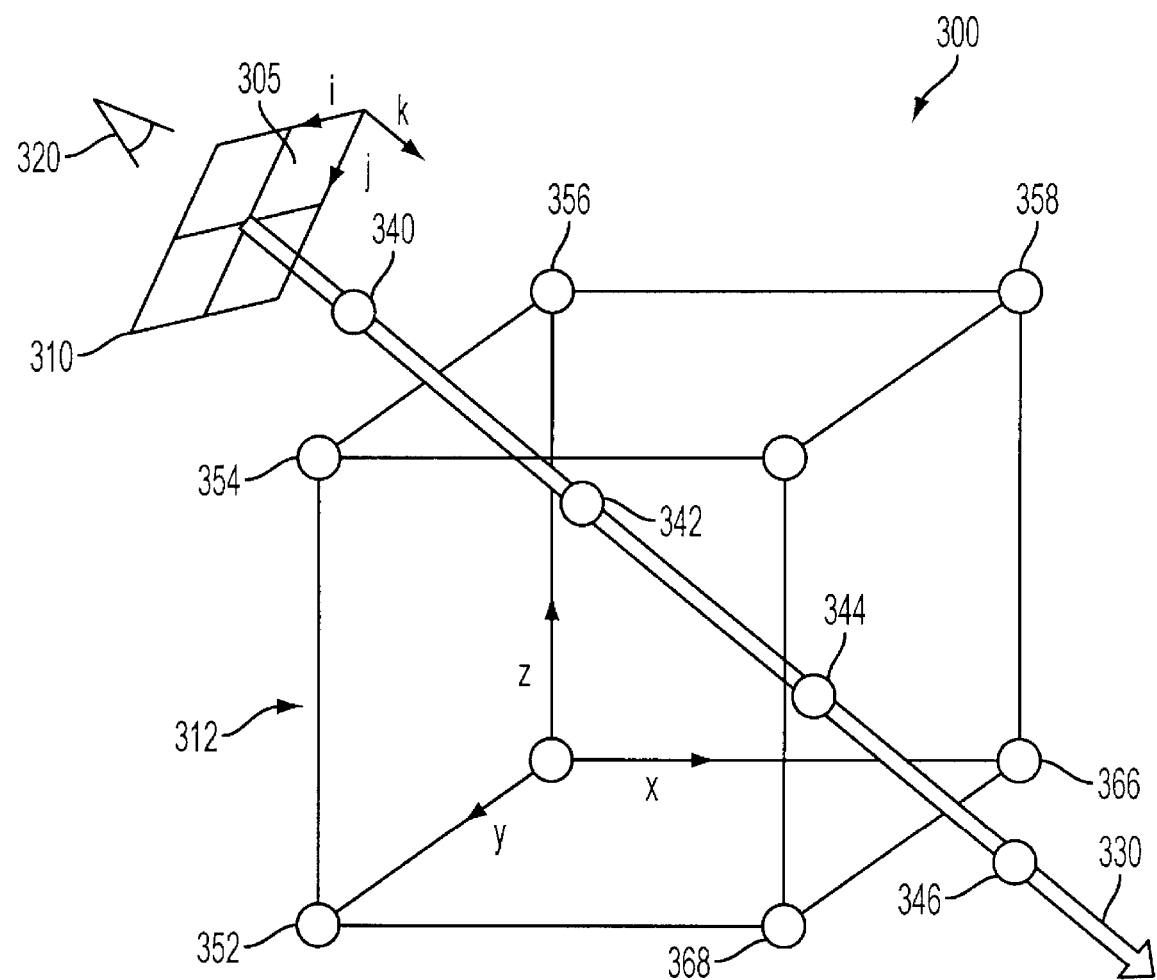
FIG. 3 shows an example of ray casting and sampling.

FIG. 3 shows an example of ray casting and sampling 300. Each projection is from a predetermined view point 320 that may be selected by a user or may be dynamically changed. A ray 330 is cast from the view point 320 through each pixel (i j) (e.g. pixel 305 is shown in FIG. 3) of imaginary projection screen 310 and through the data field, or volume 312. At discrete k locations 340, 342, 344 and 346 along the ray 330, the data is re-sampled from neighboring voxels 352, 354, 356, 358, 366 and 368. Various rendering algorithms may be used to calculate a pixel value for pixel (i, j) in dependence on voxels that are near the ray locations in the volume 312.

Figure 4A:
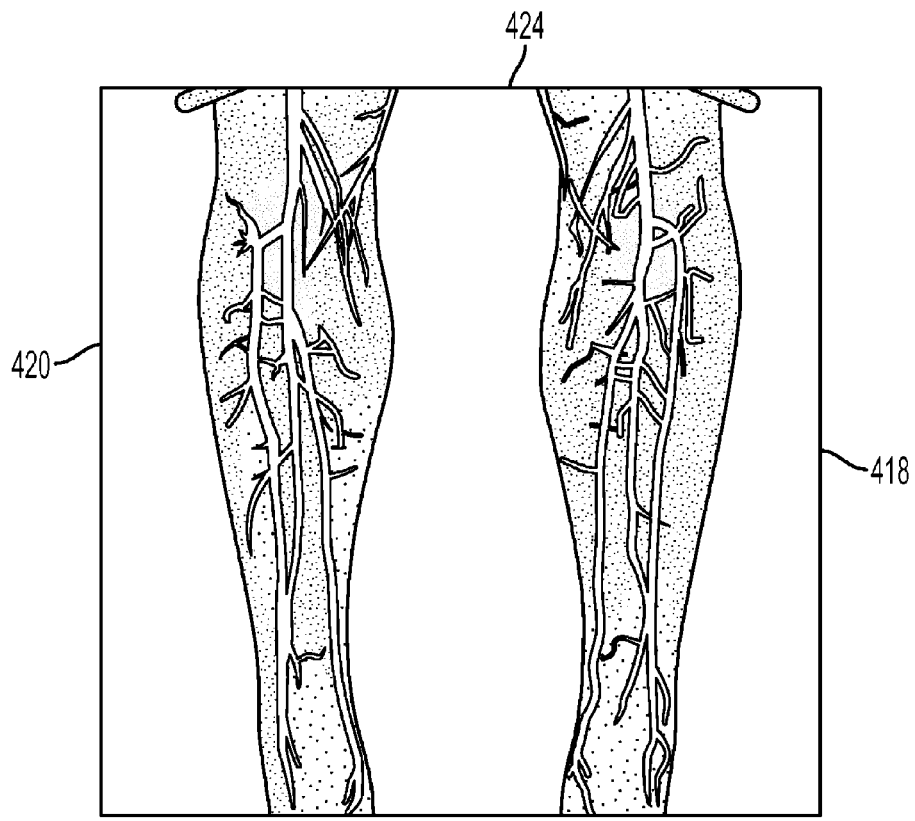
FIG. 4A shows an example of a rendered image of an MR leg volumetric data set.

FIG. 4A shows a MIP rendered image 450 of an MR leg volumetric data set. A Raycast based method is used to render this medical image. The rendered image 450 shows two legs, 418 and 420, respectively. Noise is also present in the results in artifact 424. The noise is due to the presence of wide band noise in the volume, a chessboard/stripe like pattern 424 is observed in the output rendered image 450.

Formation of Artifacts:

In order to better understand how the artifacts shown in FIG. 4A are formed in a raycast rendered MIP image, consider a volume of dimensions 256×256×256 containing only unbiased white Gaussian noise. The voxel dimension along the three axes is 1 unit (i.e. the voxel forms a cube of dimension 1×1×1 unit$^3$).

Raycast rendering is performed by shooting a ray from each pixel in the output image into the volume. Assuming that the distance between rays (or pixels) along the scan-line is 1.1 units. Hence, the rays intersect the volume at position 1.0, 2.1, 3.2, 4.3, . . . , 9.8, 10.9, 12, 13.1, . . . etc. Interpolation is then performed to compute the sample values along each ray. At ray positions 1 and 12, the ray falls exactly on the voxel grid. When interpolation is performed, the contributions from all the neighboring samples are zero and only the current sample on the grid is taken into account to calculate the maximum along the ray.

If the scalar value at the intersecting voxel is white random noise and the volume is large enough (e.g., 256 samples per ray), the maximum value picked along this ray is likely to be more than about three standard deviations of random noise. For all the other ray positions, the interpolated samples have a smaller variance than those on the grids due to the low pass filtering effects of interpolation. Thus, the maximum value from the ray on the grid is likely to be greater than those rays between the voxel grids. This difference results in a formation of stripes in the MIP image (shown as pattern 424 in FIG. 4B). The width of this stripe depends on the zoom factor or the ratio of voxel distance and the pixel distance. The stripes can be formed both horizontally and vertically, which results in the chessboard like pattern.

Figure 4B:
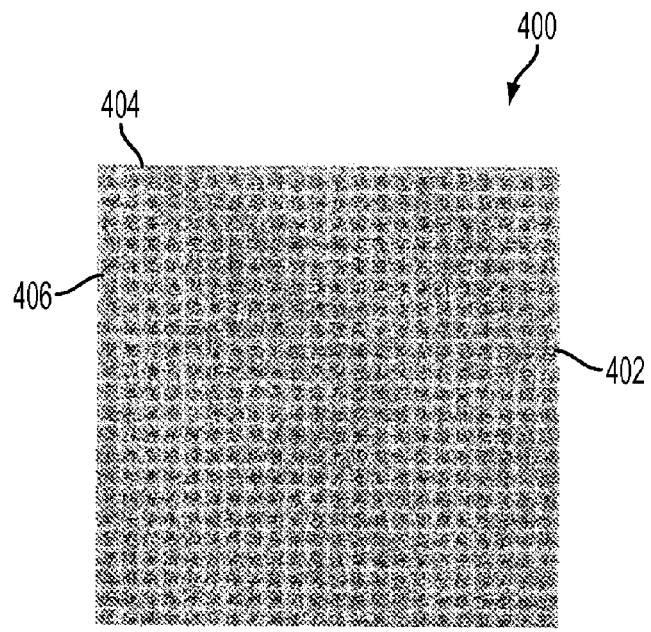
FIG. 4B shows an example of chessboard artifacts from a white noise volume.

FIG. 4B shows a MIP rendered image 400 of a synthesized volume containing only wide band Gaussian noise 402. This volume has been rendered using raycast and shows the clear chessboard/stripe like patterns 402, which have a series of vertical lines 404 and a series of horizontal lines 406.

One way to eliminate the chessboard artifacts is to recognize that the variance of noise should be kept similar for all the rays. One simple mitigation method is to pre-filter the noisy data set. However, pre-filtering can reduce the high frequency components in the image permanently. This is less than desirable since there may be valuable high frequency components that will be filtered out.

Another technique to reduce chessboard artifacts in an image is to render the image with a zoom factor and sampling step size of one. When the step size and zoom factor are both equal to one, all the rays intersect the volume at the voxel grids. After rendering, the generated 2-D image is scaled to the appropriate zoom factor. Shearwarp is one variation of this simple method that can be used to avoid this problem. However, this method is a biased estimation of maximum intensity and thereby shifts the intensity value to a higher value (signal+2-3 times of noise standard deviation). This shift in maximum intensity value is very visible in low intensity regions. Moreover, the 2-D scaling performed by Shearwarp can blur the image and result in loss of image detail.

To minimize the high frequency component loss while also mitigating the chess board artifacts, it is an embodiment of the present invention to introduce a family of new grid methods, these include 1.) applying a localized low pass filter to sample points near or on a voxel, 2.) applying a localized high order interpolation kernel and 3.) applying localized distance remapping methods. These methods are applied on-the-fly during MIP rendering and only affect the samples that are on or near a voxel grid. These methods can effectively reduce the chessboard artifacts with minimal high frequency loss. The three methods (1 to 3) are independent of each other and describe different approaches that may be used to balance out the variance in noise. For all the above methods (1-3), the filter/remapping strength is typically based on the regional intensity of the voxels. The regional intensity may be pre-processed before rendering the image. Alternatively, an octree structure, as described herein, could be utilized to store the minimum and maximum intensity values of a region.

Furthermore, for all the above methods (1-3), the filter/remapping strength may be controlled based parameters such as a zoom factor, voxel dimensions (voxel size along the x, y and z directions), and/or render direction.

Figure 5:
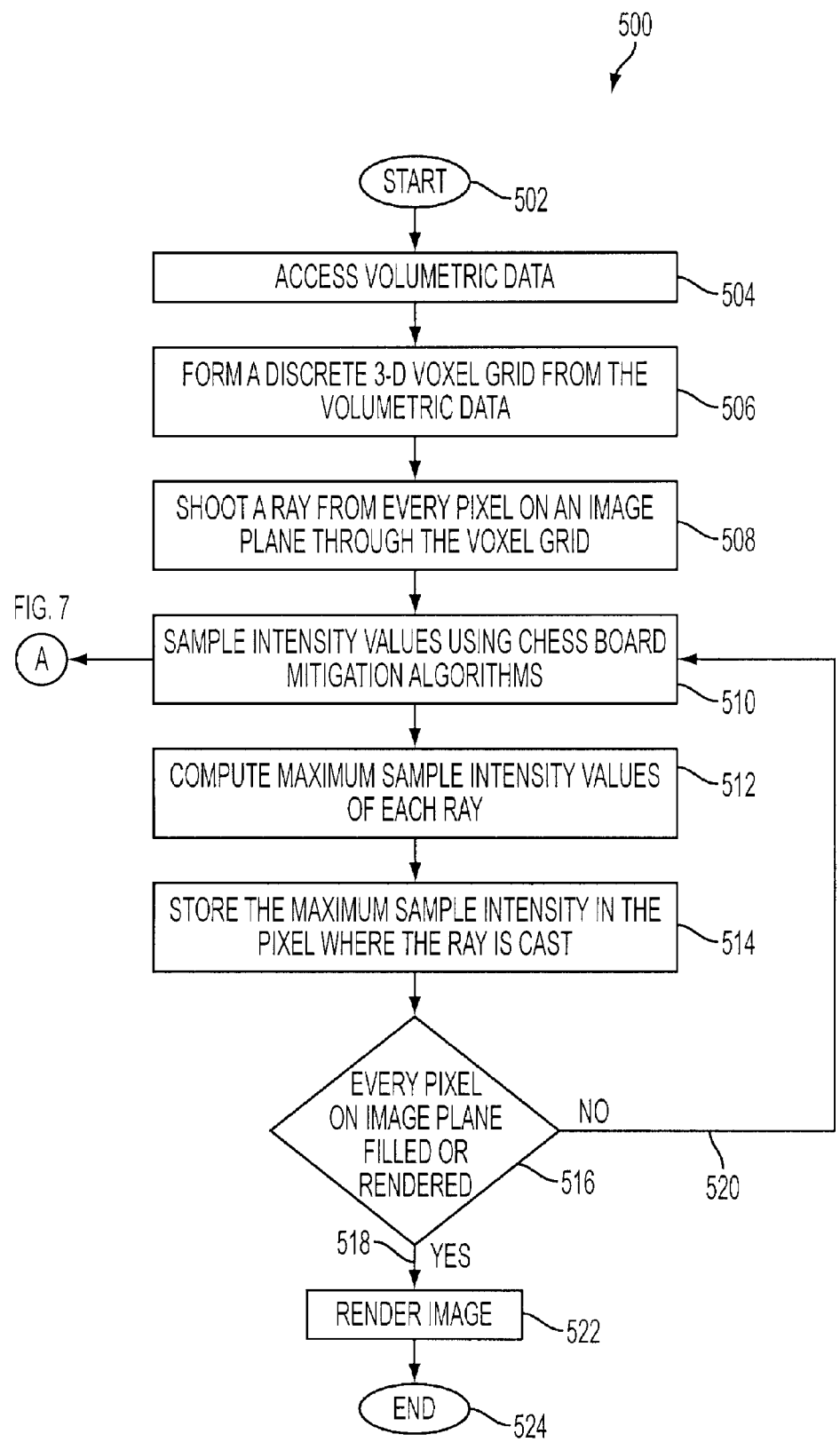
FIG. 5 shows a flowchart of steps to implement an embodiment of the present invention.

FIG. 5 shows a flowchart of steps 500 to implement an embodiment of the present invention. The flowchart of FIG. 5 shows that the noise that forms the chessboard pattern can be substantially reduced, and, in most instances, completely eliminated when viewed by the human eye, by maintaining a uniform variance of the noise during the rendering of the image.

The steps 500 may be executed by a processor, or otherwise executed to perform the identified functions and may also be stored in one or more memories (e.g., memory module 204 shown in FIG. 2 herein). For example, the steps of FIG. 5 may be stored on a computer-readable medium, such as ROM, RAM, EEPROM, CD, DVD, or other non-volatile memory. The program code stored on an electronic memory medium is a structural element. The algorithm 500 is performed on the volumetric data, which has random noise. It is recognized that the noise is completely random and must be addressed while it is in the volumetric data representation.

As shown in FIG. 5, the algorithm begins with a start step 502. Volumetric data is accessed as shown in step 504. The volumetric data may be accessed from an image data acquisition device such as an x-ray apparatus, CT apparatus, PET apparatus or similar volumetric data producing apparatus.

A discrete three-dimensional (3-D) voxel grid is formed from the volumetric data, as shown in step 506. This voxel grid provides a framework to map the 3-D voxel representation into a 2-D representation and includes grid points. Each grid point represents a center point of a corresponding voxel.

Step 508 shows that virtual rays are shot, or cast, from every pixel on an image plane through the voxel grid. To view an object represented by volumetric data, the values are mapped into pixels in the image plane. (See discussion of FIG. 3 herein.) For example, a plurality of rays are cast from a 2-D radiation plane into the image volume, each ray casting responsible for identifying the maximum data value (e.g., intensity) at a voxel within the image volume along its respective ray path and transferring it into an image value at a pixel on a 2-D image plane through a predefined screen transfer function.

For example, a 3-D data set may be acquired and sampled with n number of samples. The mean and standard deviation of the intensity values for those samples may be calculated. The lower limit and upper limit of a transfer function may be computed as follows:

Lower Limit=LL=μ−Nxσ

Upper Limit=UL=μ+Nxσ

Where μ, σ, N are the mean, the standard deviation, and the number of standard deviations respectively. The corresponding opacity transfer function is as follows:

$$TF(x) = \begin{cases} A & x \leq LL \\ \frac{B-A}{UL-LL}x+c & LL < x < UL \\ B & x \geq UL \end{cases}$$

TF(x) is the transfer function, x is the voxel intensity value, A and B are opacity values and are between 0 and 1, c is the y-intercept with opacity y-axis.

The number of rays shot through the voxel grid depends on the volumetric data and/or the image that is to be produced. For example, a ray may be cast through a grid area, between voxels or through the center of a voxel.

Step 510 shows the intensity values along each ray are sampled using chessboard mitigation algorithms, for example 1.) applying a localized low pass filter to sample points near or on a voxel, 2.) applying a localized high order interpolation kernel and 3.) applying localized distance remapping methods. (Chessboard mitigation algorithms are described in more detail herein).

The sampling occurs for each ray with a defined step. For the purpose of viewing, the data of the voxel data are usually expressed abstractly in terms of color and opacity. It is also an embodiment of the present invention that color may be used to differentiate a particular object property, such as density or heat distribution, and the opacity of the color may indicate the relative intensity of the differentiation.

Step 512 shows that maximum sample intensity values of each ray are computed.

The maximum sample intensity value of each ray is stored in the pixel where the ray is cast, as shown in step 514.

A determination is made whether every pixel on the image plane is filled or rendered, as shown in decision step 516. If not, "no" line 520 shows that sampling step 510 is reached and the process is repeated. If so, "yes' line 518 leads to step 522, which shows that an image is rendered. The rendered image may be stored, displayed and/or output. The algorithm ends, as shown by end step 524. The rendered image has reduced chessboard artifacts.

As stated previously, any technique to equalize the noise variance may be used. For purposes of illustration, near grid low pass filtering and near distance mapping are discussed in more detail herein.

Figure 7:
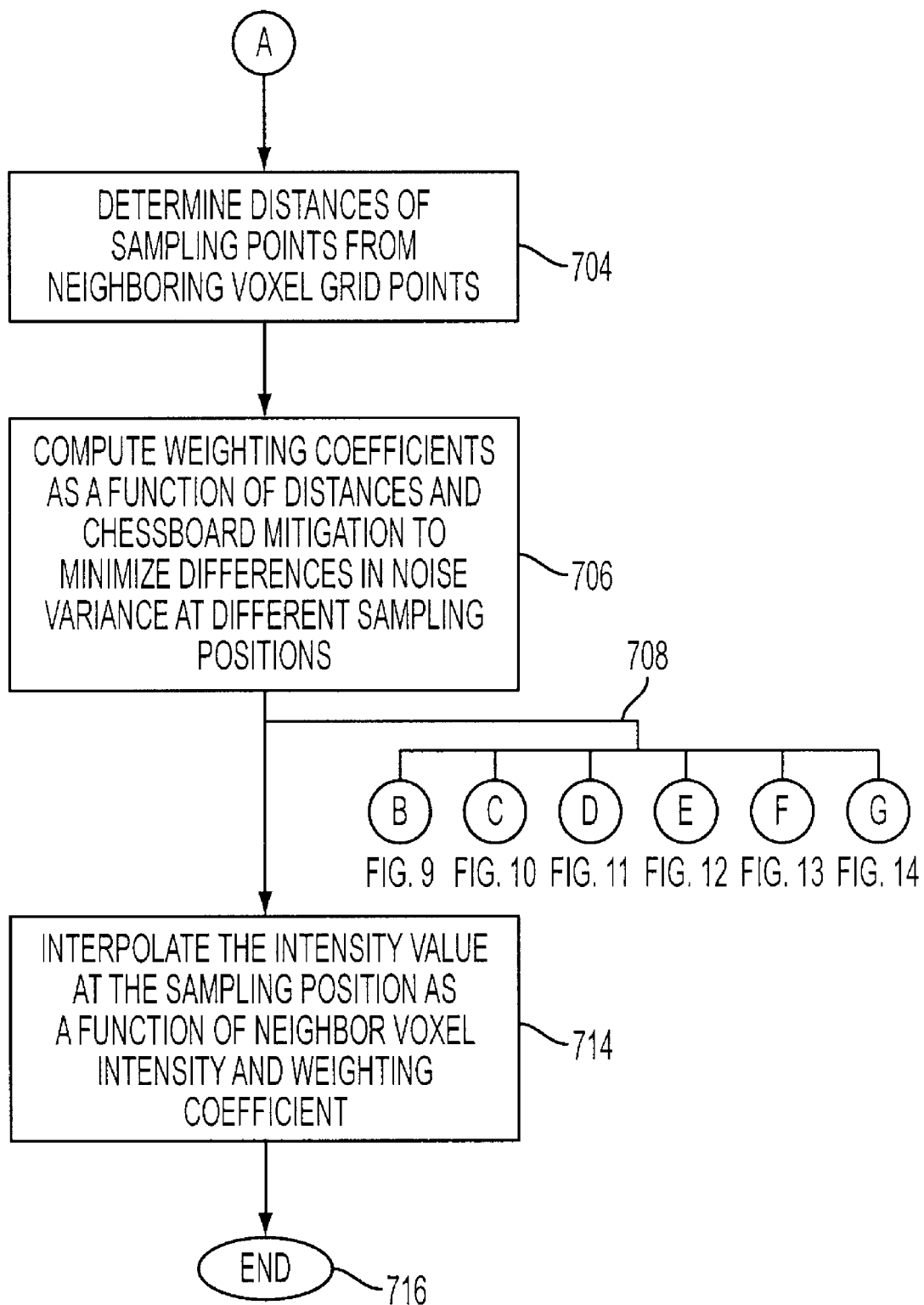
FIG. 7 shows a flowchart of steps to sample values using chessboard mitigation algorithms according to an embodiment of the present invention.

FIG. 7 shows a flowchart of steps, or algorithm, 700 to sample values using chessboard mitigation algorithms. (FIG. 7 is based on node "A" from step 510 of FIG. 5). Algorithm 700 may be program code that is stored in a computer-readable medium, such as memory module 204 of FIG. 2. The program code stored on an electronic medium is a structural element.

Step 704 shows that a determination is made of distances of sampling points from neighboring voxel grid points. For example, the determination is made for each sample point relative to an associated voxel grid point. (See discussion of FIG. 6 herein). Samples are obtained along a ray with a fixed step size. At each sample point, the voxel intensities close to the sample point are used to compute, or interpolate, the value at the sample point e.g., in case of tri-linear interpolation, it is possible to use the 8 neighboring voxels to compute the intensity of the sample.

Step 706 shows that weighting coefficients are computed as a function of the distance and chessboard mitigation is used such that differences in noise variance at different sampling positions are minimized. The weighting coefficient computation and chessboard mitigation to minimize noise variance is described in more detail, as shown by line 708, leading to nodes "B"-"G", which are described in more detail in FIGS. 9-14, respectively. Of these, "E" is a filter method, "F" is a high order interpolation method and "G" is a distance mapping method, all of which are different methods to compute the weighting coefficients. "B" "C" and "D" are methods that can be used in all three cases ("E", "F" and "G") to control the weighting coefficients.

Step 714 shows that the intensity value at the sampling position is interpolated as a function of neighbor voxel intensity and the weighting coefficient. For example, the interpolation may include computing an interpolation of data along a number of closest sample positions, for example the 4 closest sample positions. Step 716 shows that the algorithm ends.

Figure 9:
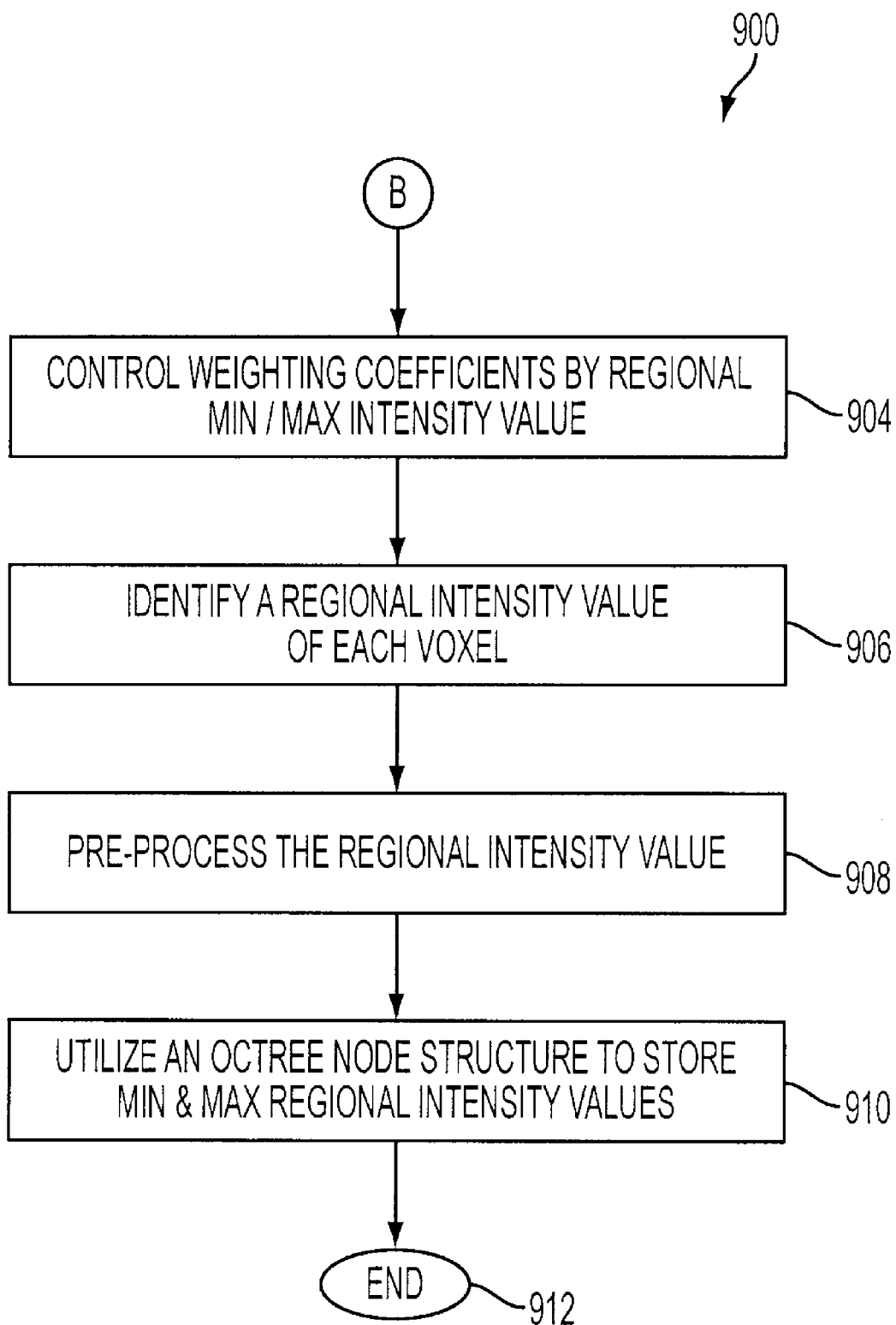
FIG. 9 shows a flowchart of steps of one embodiment to control weighting coefficients by regional min/max intensity values according to the present invention.

FIG. 9 shows a flowchart of steps 900 of one embodiment to control weighting coefficients by regional min/max intensity values according to the present invention (node "B" of FIG. 7). The algorithm 900 may be stored in a computer-readable medium, such as memory module 204 described in FIG. 2. The program code stored on an electronic medium is a structural element. Step 904 shows that the weighting coefficients may be controlled by regional min/max intensity values. The minimum and the maximum values for each octree node may be pre-calculated and stored during the loading of the volume. Accordingly, the minimum and the maximum values may be used to lookup the maximum regional variation table Var[min][max] to get the maximum intensity variation inside the node.

An example of reduced path octree data structure is described in U.S. application Ser. No. 11/158,879 to Yang et al., the entirety of which is incorporated by reference.

Step 906 shows identification of a regional intensity, or opacity value of each voxel. The regional opacity $\alpha_{diffsum}$ of a node may be determined by subtracting the table entry of the maximum value and the table entry of the minimum value. Thus, the expression "lutsum[max]−lutsum[min]" as illustrated in equation (6), may be used to determine how translucent a node is; that is, its regional opacity $\alpha_{diffsum}$. If the table entries have the same value, the node is said to be empty, as are all voxels contained within this node, and therefore the node is completely translucent ($\alpha_{diffsum}=0$). The maximum variation table Var[a][b] and the regional opacity $\alpha_{diffsum}$ need to be re-computed every time the transfer function changes. The maximum variation table Var[a][b] needs to be calculated at a pre-processing step, while the regional opacity $\alpha_{diffsum}$ for each octree node may be either filled-in during pre-processing or evaluated during run-time.

Equation (6) illustrates an example of determining the regional opacity $\alpha_{diffsum}$.

$$\alpha_{diffsum} = lutsum[530] - lutsum[15] \quad (6)$$

In the example of equation (6), the minimum and the maximum values of the octree node are 15 and 530, respectively. Compared to the original volume data and the reduced path octree data structure, the alpha summed area table is small in size and easy to compute. For example, a typical alpha summed area table for 16×16×16 nodes has only 4096 entries.

Step 908 shows that the regional intensity value may be pre-processed. For example, a pre-processing step may be performed on the volumetric data to divide the volumetric data into cubes and within each cube a maximum and minimum intensity value may be calculated. These maximum and minimum intensity values may be used to calculate a mean intensity level that can be used as a level to compare other points in the cube.

Step 910 shows that an octree node structure may be used to store minimum and maximum regional intensity values. An octree is a data structure that may be used to efficiently traverse a 3D dataset representing a volumetric image. In one exemplary, non-limiting method of constructing an octree, each group of 8 adjacent voxels of a dataset is grouped into a first-level parent node. In a 512×512×512 dataset, one obtains 256×256×256 first level nodes of size 2×2×2. Then, each group of 8 adjacent first-level nodes are grouped into the next level parent node, etc. This process can be repeated until every voxel in the dataset has been so grouped, with the top level node forming the top of the octree structure. The top level node of an octree is referred to as the root node, which usually contains information about the entire dataset volume. Each intermediate layer node contains information about the nodes at the next lower level. During run-time ray casting, each ray is traced by traversing the octree first from the root node. If the parent node indicates that it is empty, then the entire subvolume is empty and nothing needs to be done. Otherwise, the ray traverses the child nodes at the next lower level. This technique of skipping empty nodes and visiting the next lower level node if a parent node is non-empty is repeated until the ray visits an individual voxel, at which point the voxel is sampled, i.e., via tri-linear interpolation.

End step 912 shows that the algorithm ends.

Figure 10:
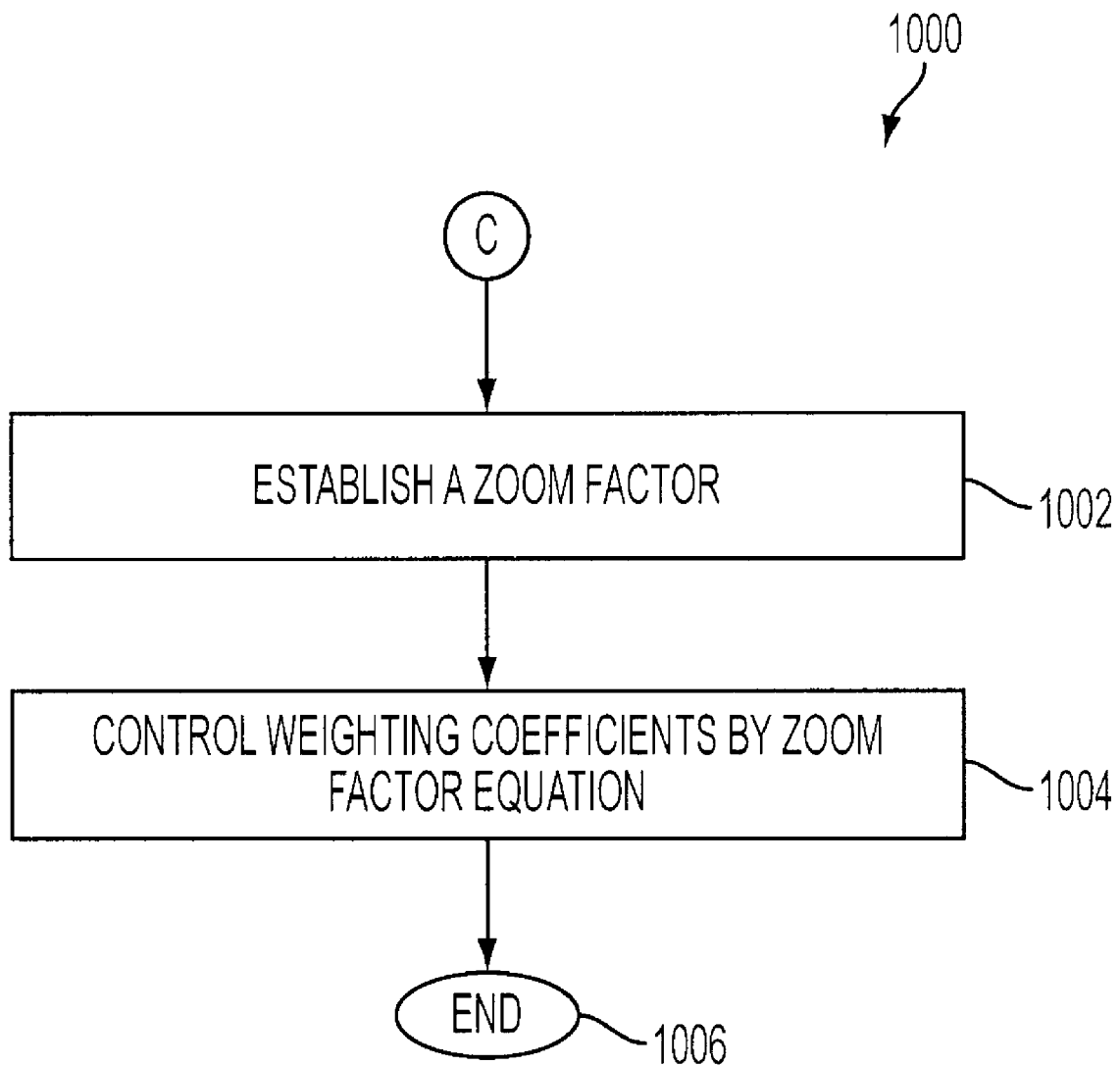
FIG. 10 shows a flowchart of steps to control weighting coefficients as a function of a zoom factor according to an embodiment of the present invention.

FIG. 10 shows a flowchart of steps 1000 to control weighting coefficients as a function of a zoom factor according to the present (node "C" of FIG. 7). The algorithm 1000 may be stored in a computer-readable medium, such as memory module 204 described in FIG. 2. The program code stored on an electronic medium is a structural element. Step 1002 shows that a zoom factor may be established and step 1004 shows that the zoom factor may be used in an equation to control the weighting coefficients.

The step of computing weighting coefficients 1004 includes controlling the weighting coefficients by the zoom factor:

$$W = \frac{W_0}{1 + zoomFactor \times M}$$

where, $W_0$ is the weighting function and M is a constant that controls the weighing function depending on the zoom factor. The zoom factor is the relation between the sample distance and the voxel distance (e.g. twice as many samples than there are voxels). The zoom factor typically shows the size of the magnified area shown in the image. The zoom factor is also discussed in relation to threshold distance mapping herein.

Step 1006 shows that the algorithm ends.

Figure 11:
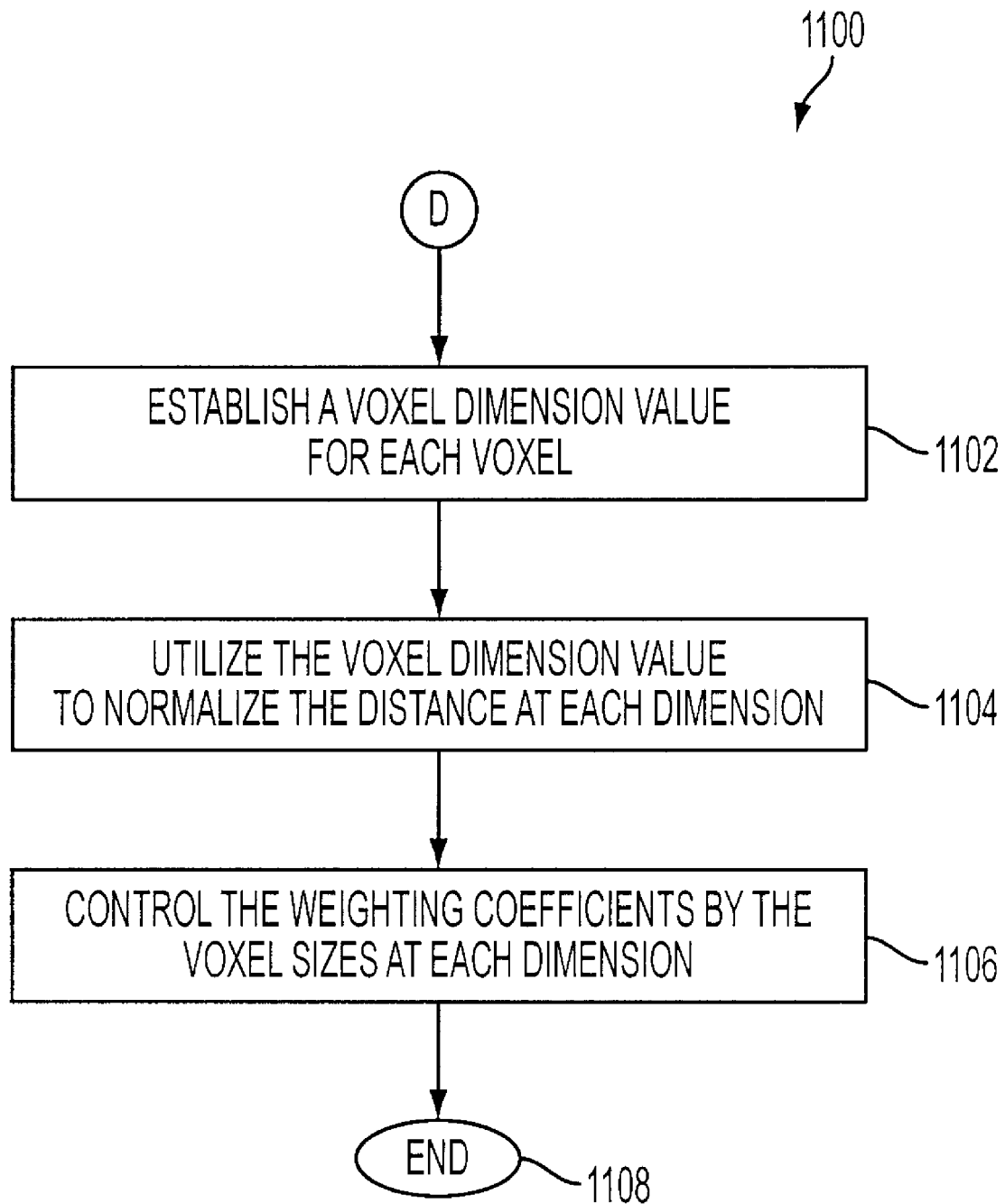
FIG. 11 shows a flowchart of steps control weighting coefficients by voxel size at each dimension according to an embodiment of the present invention.

FIG. 11 shows a flowchart of steps, or algorithm, 1100 to control weighting coefficients based on voxel sizes according to an embodiment of the present invention (node "D" of FIG. 7). The algorithm 1100 may be stored in a computer-readable medium, such as memory module 204 described in FIG. 2. The program code stored on an electronic medium is a structural element. Step 1102 shows that a voxel dimension value for each voxel is established. Step 1104 shows that the voxel dimension value is used to normalize the distance at each dimension. The normalization may include pre-scaling voxel values to ensure the values do not exceed a pre-determined size threshold. Step 1106 shows that the weighting coefficients are controlled by the voxel sizes at each dimension. Step 1108 shows that the algorithm ends.

Figure 12:
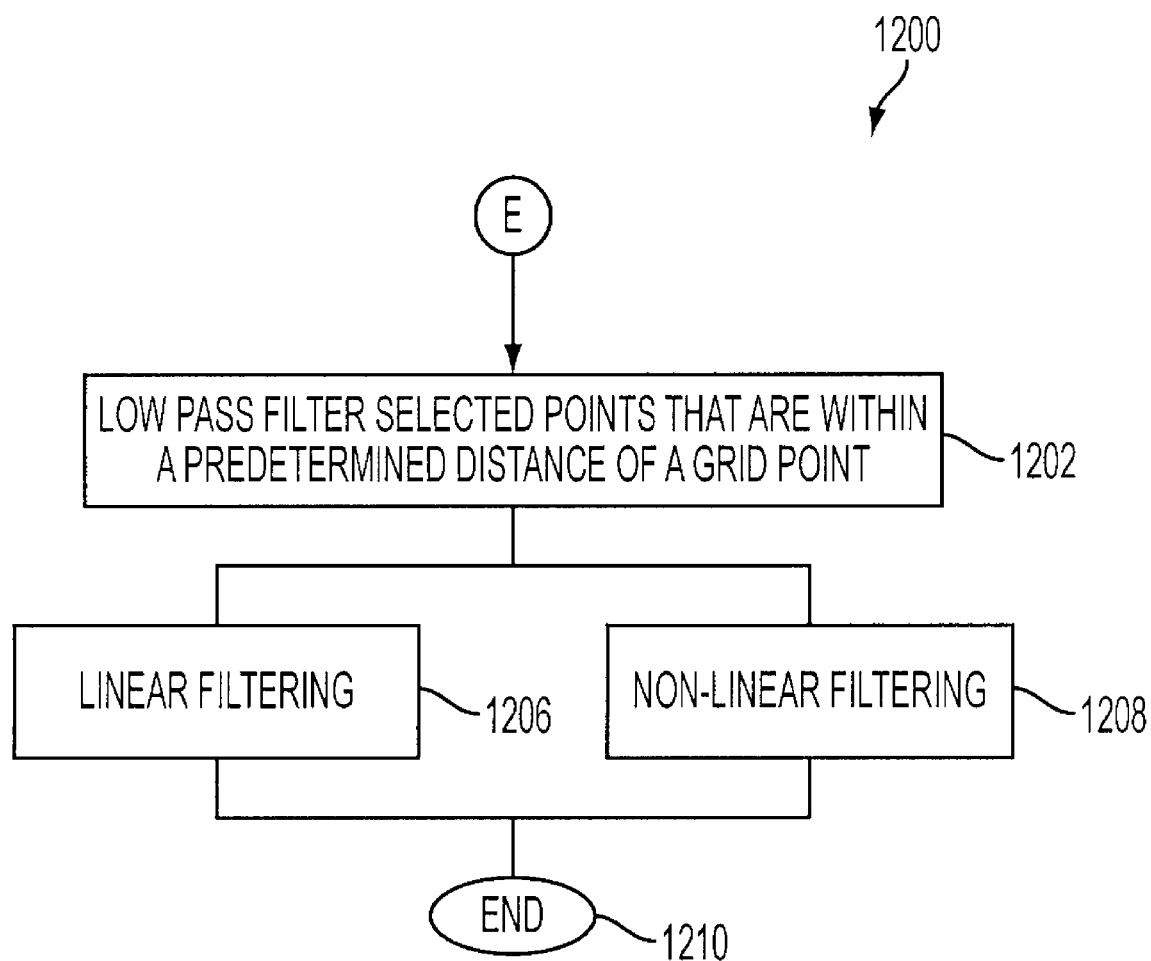
FIG. 12 shows low pass filtering may be used to reduce chessboard artifacts according to an embodiment of the present invention.

FIG. 12 shows a flowchart of steps, or algorithm, 1200 to mitigate chessboard artifacts by lowpass filtering according to the present invention (node "E" of FIG. 7). The algorithm 1200 may be stored in a computer-readable medium, such as memory module 204 described in FIG. 2. The program code stored on an electronic medium is a structural element. Step 1202 shows that selected points that are within a predetermined distance of a grid point are low pass filtered. When the sample is on or near a grid point, the low-pass filter effect (or smooth effect) from interpolation is reduced or totally lost because some or all of the contributions from the neighboring voxels are zero. In order to balance the noise variances across the samples, for both near-grid samples and for samples far away from the grids, an on-the-fly low pass filter is applied only to those samples that are close to the voxel grid. This filtered value is then used in the tri-linear interpolation (e.g., step 714 of FIG. 7).

In this manner, contributions from neighboring voxels are also introduced for near-grid samples—thus reducing the noise variance. In order to prevent high frequency loss or over smoothing, the cutoff frequency of the filter is preferably near or higher than the tri-linear interpolation. Moreover, over smoothing can cause the variance, with near grid low-pass filter, to be much lower than that with tri-linear interpolation—which could result in the formation of dark stripes or chessboard patterns.

To have a smooth variance transition from the far grid sample to the new grid sample, the cutoff frequency of the low pass filter is controlled by the distance between the sample position and the nearest voxel grid. In general the closer the sample is to the voxel grid, a stronger smoothing is applied by the low-pass filter.

Many possible low pass filters can be used. They can be 1-Dimensional, 2-Dimensional or 3-Dimensional depending on the noise distribution. If the noise distribution is unknown, a 3-Dimensional low-pass filter kernel can be used. Below is an example of a 2D Gaussian filter. This 2-D example can be easily extended to 3-D.

The Gaussian distribution in 2D form:

$$G(x, y) = \frac{1}{2\pi\sigma^2} e^{-\frac{x^2+y^2}{2\sigma^2}}$$

In theory, the Gaussian filter is non-zero everywhere. However, in practice it is effectively zero when the value is more than about three standard deviations from the mean, and it is possible to truncate the kernel at this point. For example a 3×3 kernel that approximates a Gaussian with $\sigma_0 = 0.5$ is as follows:

$$K = \frac{1}{100} \begin{array}{|c|c|c|} \hline 1 & 8 & 1 \\ \hline 8 & 64 & 8 \\ \hline 1 & 8 & 1 \\ \hline \end{array}$$

The filter sigma value is modulated by the distance from the sample to the voxel grid.

$$\sigma = \frac{\sigma_0}{(1+ky)^\gamma}$$

Where, $\sigma_0$ is the maximum sigma value of Gaussian function when the distance, $\gamma$, from sample to the voxel grid is zero; k is a constant that controls modulation depth.

The low pass filtering may be either linear filtering, as shown in step 1206 or non-linear, as shown in step 1208. End step 1210 shows that the algorithm ends.

Figure 13:
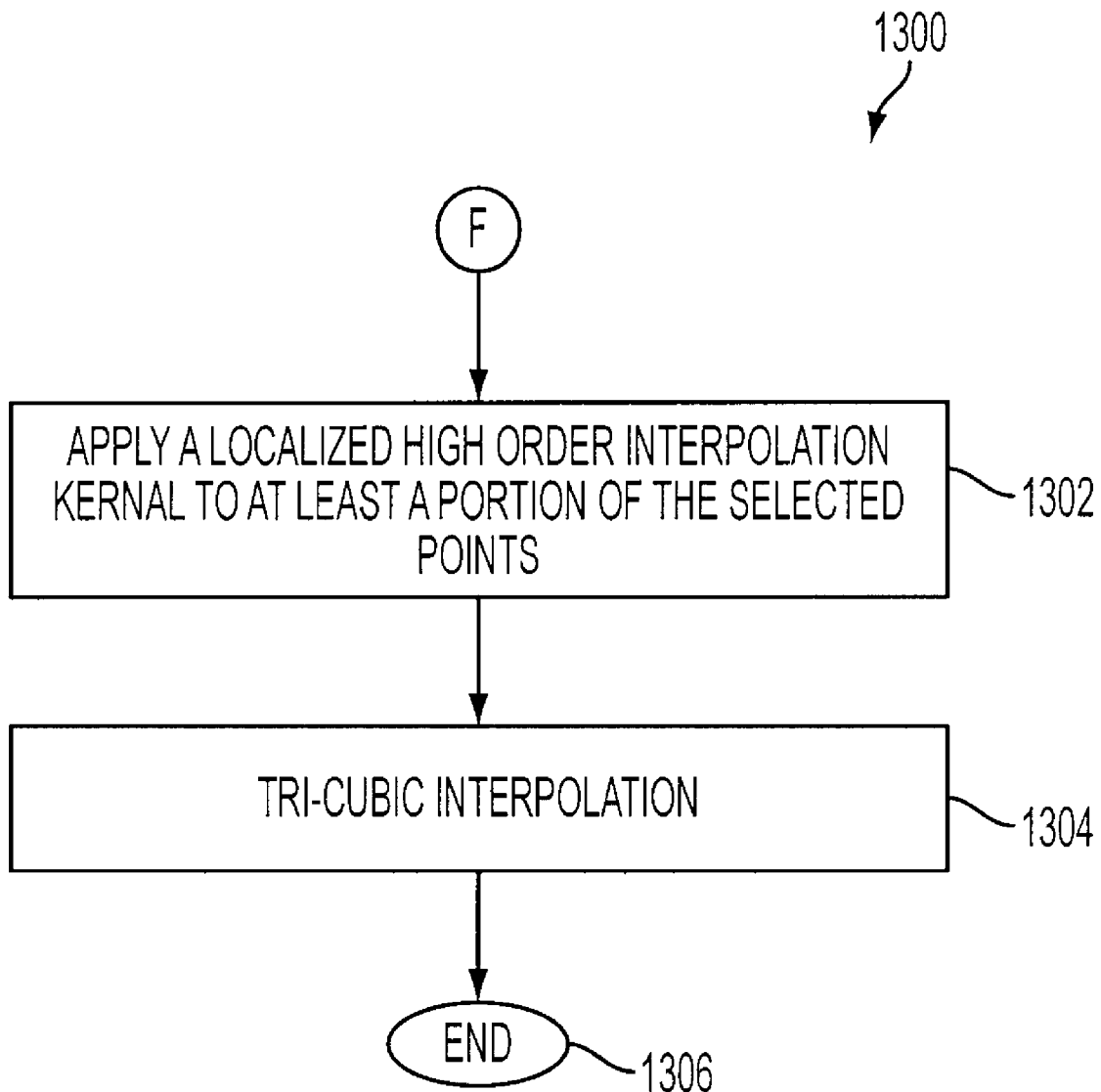
FIG. 13 shows interpolation may be used to reduce chessboard artifacts according to an embodiment of the present invention.

FIG. 13 shows a flowchart of steps, or algorithm, 1300 of yet another embodiment to mitigate chessboard artifacts using a high order interpolation kernel (node "F" of FIG. 7). The algorithm 1300 may be stored in a computer-readable medium, such as memory module 204 described in FIG. 2. The program code stored on an electronic medium is a structurally element. Step 1302 shows applying a localized high order interpolation kernel to at least a portion of the selected points.

Step 1304 shows that the interpolation is, for example, tri-cubic interpolation. Step 1306 shows that the algorithm ends.

Figure 14:
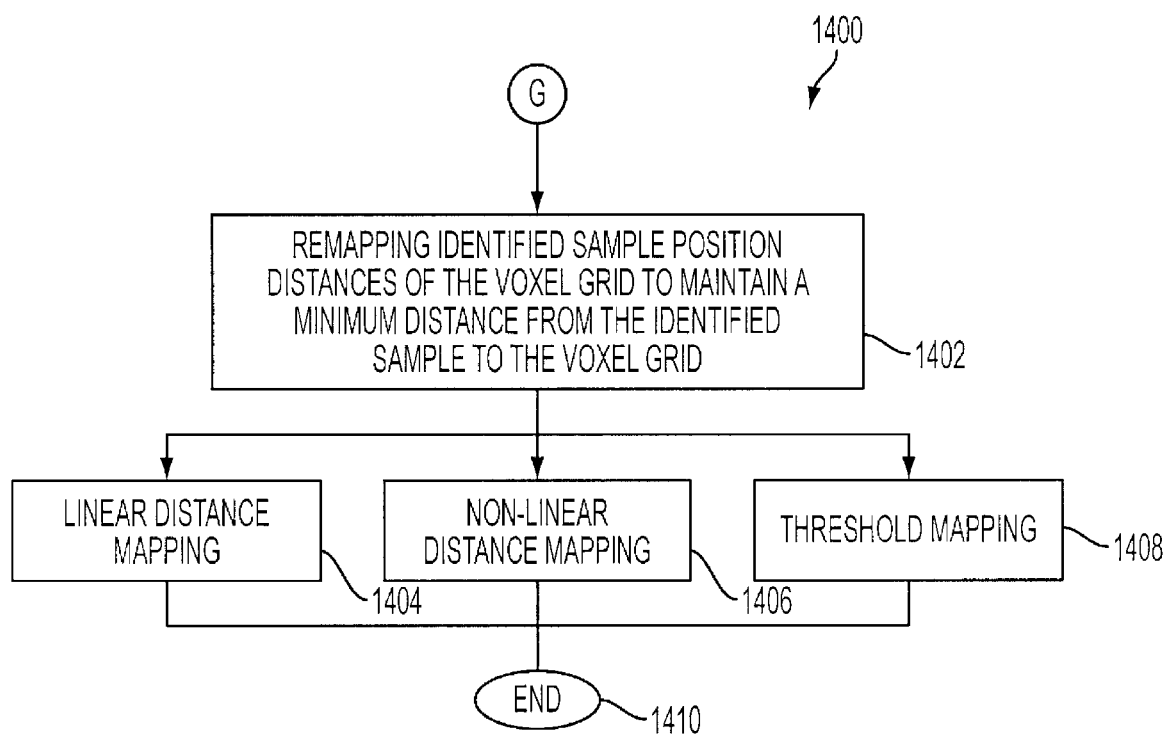
FIG. 14 shows remapping may be used to reduce chessboard artifacts according to an embodiment of the present invention.

FIG. 14 shows a flowchart of steps, or algorithm, 1400 of remapping to mitigate chessboard artifacts (node "G" of FIG. 7). The algorithm 1400 may be stored in a computer-readable medium, such as memory module 204 described in FIG. 2. The program stored on an electronic medium is a structural element. Step 1402 shows that identified sample position distances of the voxel grid are remapped to maintain a minimum distance from the identified sample to the voxel grid. Step 1404 shows that one example of remapping is linear distance mapping. Step 1406 shows that another example of remapping is non-linear distance mapping and step 1408 shows that yet another example of remapping is threshold mapping. Step 1410 shows that the algorithm ends. Remapping is described in more detail in relation to FIG. 8 herein.

Figure 6:
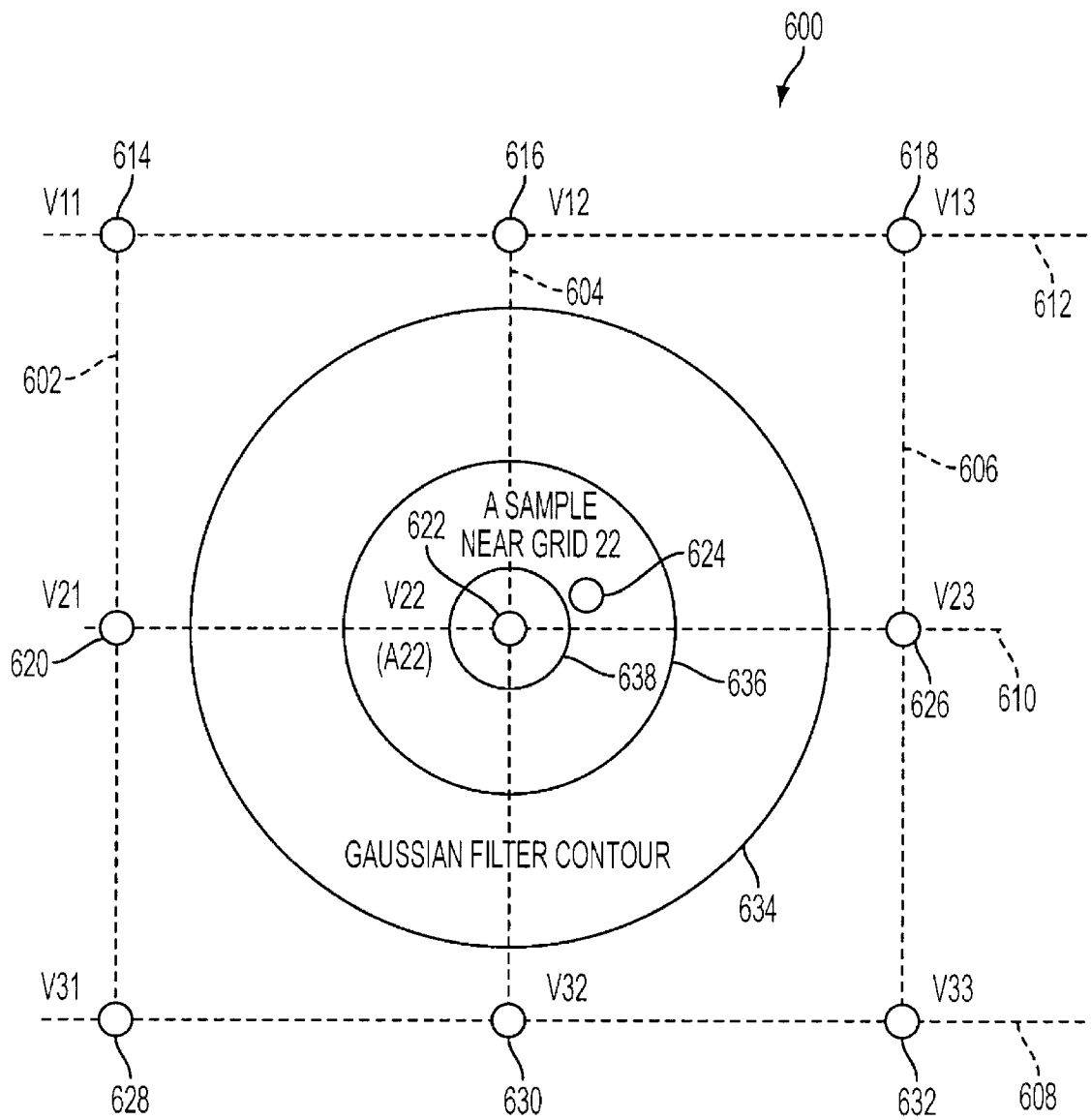
FIG. 6 shows an example of near-grid low pass filtering method.

FIG. 6 shows an example of near-grid low pass filtering. Grid 600 has vertical components 602, 604 and 606 and horizontal components 608, 610 and 612. FIG. 6 shows voxel points $V_{1,1}$ (614), $V_{1,2}$ (616), $V_{1,3}$ (618), $V_{2,1}$ (620), $V_{2,2}$ (622), $V_{2,3}$ (626), $V_{3,1}$ (628), $V_{3,2}$ (630), and $V_{3,3}$ (632). Also shown are contour rings 634, 636 and 638. A sample location point 624 is also shown.

In the example shown in FIG. 6 the sample location point 624 is near the voxel grid $V_{2,2}$ (622). The value at voxel $V_{2,2}$ (622) is filtered by the Gaussian kernel.

$$A_{2,2} = \sum_{i=1}^{3} \sum_{j=1}^{3} V_{i,j} \times K_{i,j}$$

The resultant filtered value, $A_{2,2}$, is then used to interpolate with $V_{1,2}$ (616), $V_{1,3}$ (618) and $V_{2,3}$ (626) to compute the sample value for the sample point 624.

Near-Grid Distance Mapping Method

Depending on the size of filter kernel, the low-pass filter based method (discussed above) can increase the memory access and computational intensity many times over. As a result, the performance of rendering can be significantly reduced. Therefore, it is an embodiment of the present invention to utilize a light weight method called the near-grid distance mapping method to improve the rendering performance.

In the near grid low-pass filter method, if the filter kernel is 2×2×2, the filter kernel coefficients can be combined with tri-linear interpolation coefficients, thus retaining the non-zero contribution from every neighboring voxel. This combination is equivalent to re-mapping the sample position's distance from the grid. If the minimum distance from a sample to the grid is maintained to be larger or equal to a threshold, then contribution from the neighboring voxels will never be zero. This is the principle of near-grid distance mapping method.

There are different ways to map the distances in each direction. In the present invention, linear distance mapping, non-linear distance mapping and simple threshold mapping methods are introduced. All these methods control how close a sample can be near a voxel grid.

In the linear-distance mapping method, the sample's distance from a voxel grid is mapped into another scale linearly. The linear distance mapping is illustrated in FIG. 8(A). Non-linear mapping is illustrated in FIG. 8(B) and threshold distance mapping is illustrated in FIG. 8(C).

FIG. 8(A) shows a graph with horizontal axis 802 and vertical axis 804. Line 810 represents the mapped distance between voxels and line 808 represents the linear relationship between x-values and y-values. The distance in x-axis is between 0 and 1. After linear mapping the distance is between $T_x$ and $(1-T_x)$, where Tx is called near-region threshold for x-axis.

Figure 8C:
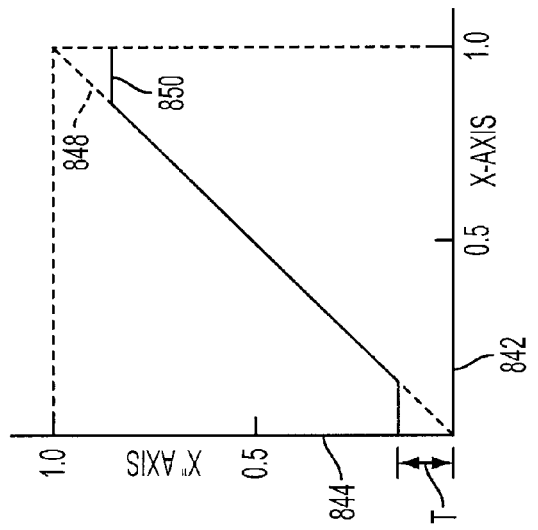
FIGS. 8A-8C show examples of near-grid distance mapping methods.
Figure 8B:
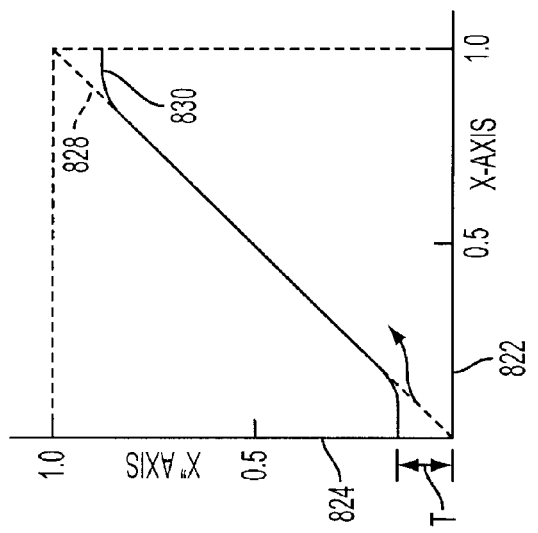
Figure 8A:
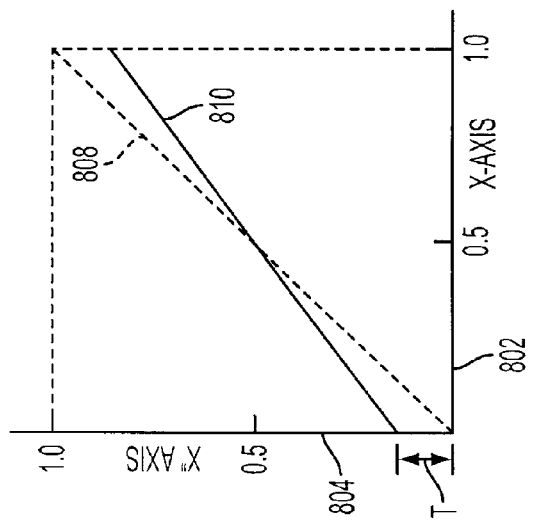

It is also possible to map the distance non-linearly as shown in 8(B) (non-linear distance mapping) and FIG. 8(C) (threshold distance mapping). For example FIG. 8(B) is a special case of non-linear mapping method in which it is possible to threshold the distance for x, y and z directions. In other words, the thresholds may be conceptualized as minimal distances from the sample in x, y and z directions. As shown in FIG. 8(B) horizontal axis 822 and vertical axis 824 have a magnitude, or scale from 0 to 1.0. Line 830 represents a distance between voxels and line 828 represents the linear relationship between x-values and y-values.

Threshold distance mapping is illustrated by FIG. 8(C). If a sample falls closer than the threshold in any direction, tri-linear interpolation will be performed using the minimal distance in that direction. These thresholds can guarantee tri-linear interpolation with contributions from the neighboring voxels at or near the grid points, and therefore can reduce the noise variance. As shown in FIG. 8(C) horizontal axis 842 and vertical axis 844 have a magnitude, or scale from 0 to 1.0. Line 850 represents a distance between voxels and line 848 represents the linear relationship between x-values and y-values.

All the near-grid distance mapping methods may create a blocky side effect similar to the nearest neighbor sampling. The block size is defined by the near-region thresholds T, which is usually much smaller than the voxel distance. When the zoom factor is small, the blocky side effect is not visible. However, when zoom factor is large (>>1) the blocky side effect can be visible in rendered MIP image. In order to improve the quality, while zooming in, the near-region threshold may be modulated by the zoom factor. For instance the threshold, T, can be defined as $$T = \frac{T_0}{1 + zoomFactor \times M}$$

where, $T_0$ is the maximum threshold and M is a constant that controls the modulation of the threshold depending on the zoom factor.

Since the chessboard artifacts are mainly due to low SNR (signal to noise ratio), the artifacts are more visible in low intensity regions (especially in air) than in high intensity regions. Using this property, it is possible to choose different modulations, M, and/or near region constants, to filter the noise with varying strengths. In a low intensity region, a relatively smaller M and/or a larger $T_0$ may be used while in a region that contains high intensity voxels, larger M and/or a smaller $T_0$ may be used. In order to determine the high and low intensity regions the histogram of the volume is analyzed during preprocessing and the intensity thresholds are derived from this histogram. Each intensity threshold is associated with a modulation constant M and near-region threshold $T_0$. This method may be combined with a reduce-path Octree raycaster algorithm.

During ray casting, it is possible to compare the maximum intensity of an N×N×N Octree node with the intensity thresholds to determine the local near-region filter parameters. The region size N can be chosen based on the use case. In experiments a (4×4×4) Octree node was used. The regional control provides additional protection to high intensity and high frequency components.

Figure 15A:
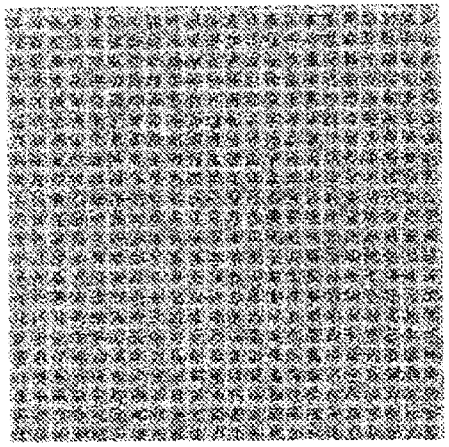
FIGS. 15A and 15B show examples of an original image and an image rendered with near-grid methods, respectively.
Figure 15B:
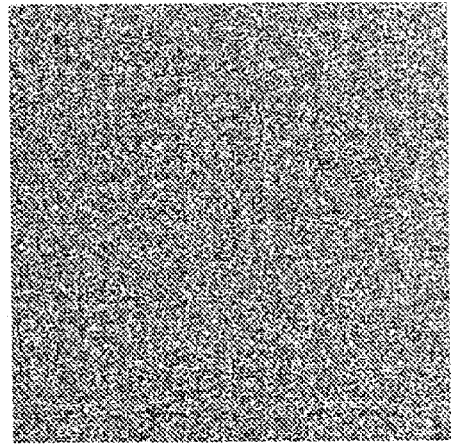
Figure 16A:
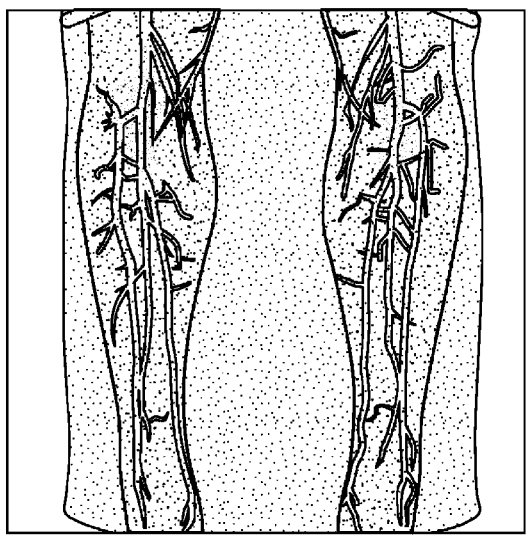
FIGS. 16A and 16B show examples of an original image and an image rendered with near-grid methods, respectively.
Figure 16B:
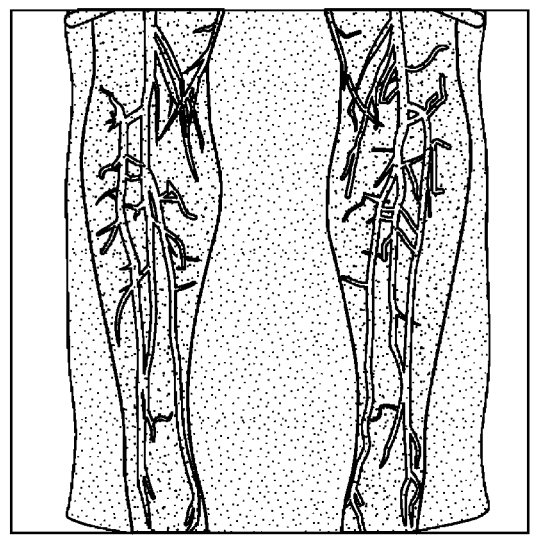

The new methods were tested on different medical volume datasets and synthesized noise volume dataset, the results of which are shown in FIGS. 15 and 16. As shown in FIGS. 15(A), 15(B), 16(A) and 16(B) the chessboard or stripe like artifacts present in the Raycast MIP rendered images, are considerably reduced when the near-grid methods are applied on-the-fly during rendering. These methods are computationally not very expensive and reduce the artifact without the elimination of the high frequency signals.

It will be appreciated from the above that an embodiment of the invention may be implemented as computer software, which may be supplied on a storage medium or via a transmission medium such as a local-area network or a wide-area network, such as the Internet. It is to be further understood that, because some of the constituent system components and method steps depicted in the accompanying figures can be implemented in software, the actual connections between the systems components (or the process steps) may differ depending upon the manner in which the present invention is programmed. Given the teachings of embodiments of the present invention provided herein, one of ordinary skill in the related art will be able to contemplate these and similar implementations or configurations of the present invention.

It is to be understood that embodiments of the present invention can be implemented in various forms of hardware, software, firmware, special purpose processes, or a combination thereof. In one embodiment, the present invention can be implemented in software as an application program tangible embodied on a computer readable program storage device. The application program can be uploaded to, and executed by, a machine comprising any suitable architecture.

The particular embodiments disclosed above are illustrative only, as the invention may be modified and practiced in different but equivalent manners apparent to those skilled in the art having the benefit of the teachings herein. Furthermore, no limitations are intended to the details of construction or design herein shown, other than as described in the claims below. It is therefore evident that the particular embodiments disclosed above may be altered or modified and all such variations are considered within the scope and spirit of the invention. Although illustrative embodiments of the invention have been described in detail herein with reference to the accompanying drawings, it is to be understood that the invention is not limited to those precise embodiments, and that various changes and modifications can be effected therein by one skilled in the art without departing from the scope and spirit of the invention as defined by the appended claims.

What is claimed is:

1. A method performed by at least one computer for rendering a chessboard artifact free Maximum Intensity Projection (MIP) image, comprising:
   accessing volumetric data, having random noise;
   forming a discrete 3-D voxel grid from the volumetric data;
   shooting a ray from individual pixels on an image plane through the voxel grid;
   sampling intensity values using chessboard mitigation algorithms along each ray with a defined step size;
   interpolating an intensity value at the sampling position as a function of neighboring voxel intensity values;
   computing a maximum sample intensity value of each ray;
   storing the maximum sample intensity value in the pixel where the ray is cast;
   repeating the shooting, sampling, computing and storing steps until the pixels on the image plane are filled or rendered; and
   rendering an MIP image.

2. The method according to claim 1, further comprising:
   establishing a render direction; and
   utilizing the render direction in the rendering step.

3. A method for rendering a chessboard artifact free Maximum Intensity Projection (MIP) image, comprising:
   accessing volumetric data, having random noise;
   forming a discrete 3-D voxel grid from the volumetric data;
   shooting a ray from individual pixels on an image plane through the voxel grid;
   sampling intensity values using chessboard mitigation algorithms along each ray with a defined step size;
   computing a maximum sample intensity value of each ray;
   storing the maximum sample intensity value in the pixel where the ray is cast;
   repeating the shooting, sampling, computing and storing steps until the pixels on the image plane are filled or rendered; and
   rendering an MIP image wherein the step of sampling intensity values using chessboard mitigation algorithms further comprises:
   determining distances of sampling points from neighboring voxel grid points;
   computing weighting coefficients as a function of the distances and chessboard mitigation factors so as to minimize differences in noise variance at different sampling positions; and
   interpolating the intensity value at the sampling position as a function of the neighboring voxel intensity values and the weighting coefficients.

4. The method as claimed in claim 3; wherein the step of computing weighting coefficients further comprises:
   controlling the weighting coefficients by regional maximum and/or minimum intensity values.

5. The method as claimed in claim 4, further comprising:
   identifying a regional intensity value of each voxel.

6. The method as claimed in claim 5, further comprising:
   pre-processing the regional intensity value.

7. The method as claimed in claim 6, further comprising:
utilizing an octree structure to store a minimum regional intensity value and a maximum regional intensity value.

8. The method as claimed in claim 3; wherein the step of computing weighting coefficients further comprises:
controlling the weighting coefficients by the zoom factors $$W = \frac{W_0}{1 + zoomFactor \times M}$$

where, $W_0$ is the weighting function and M is a constant that controls the weighing function depending on the zoom factor.

9. The method as claimed in claim 8, further comprising:
establishing a zoom factor.

10. The method as claimed in claim 3, wherein the step of computing weighting coefficients further comprises:
controlling the weighting coefficients by the voxel sizes at each dimension.

11. The method as claimed in claim 10, further comprising:
establishing a voxel dimension value for each voxel; and
utilizing the voxel dimension value to normalize the distance at each dimension before computing the weighting coefficients.

12. The method as claimed in claim 3, wherein the step of computing weighting coefficients further comprises:
low pass filtering selected points that are within a predetermined distance of a voxel grid point.

13. The method as claimed in claim 12, wherein the low pass filtering is linear filtering.

14. The method as claimed in claim 12, wherein the low pass filtering is non-linear filtering.

15. The method as claimed in claim 3, wherein the step of computing weighting coefficients further comprises:
applying a localized high order interpolation kernel to at least a portion of the selected points.

16. The method as claimed in claim 15, wherein the interpolation kernel comprises tri-cubic interpolation.

17. The method as claimed in claim 3, wherein the step of computing weighting coefficients further comprises:
remapping the identified sample position distance from the voxel grid to maintain a minimum distance from the identified sample to the voxel grid,
wherein the minimum distance exceeds a predetermined threshold.

18. The method as claimed in claim 17, wherein the remapping further comprises:
linear distance mapping.

19. The method as claimed in claim 17, wherein the remapping further comprises:
non-linear distance mapping.

20. The method as claimed in claim 17, wherein the remapping further comprises:
threshold mapping.

21. An apparatus for rendering a chessboard artifact free Maximum Intensity Projection (MIP) image, comprising:
means for accessing volumetric data, having random noise;
means for forming a discrete 3-D voxel grid from the volumetric data;
means for shooting a ray from individual pixels on an image plane through the voxel grid;
means for sampling intensity values using chessboard mitigation algorithms along each ray with a defined step size;
means for interpolating an intensity value at the sampling position as a function of the neighboring voxel intensity values;
means for computing a maximum sample intensity value of each ray;
means for storing the maximum intensity value in the pixel where the ray is cast; and
means for rendering an MIP image.

22. The apparatus according to claim 21, further comprising:
means for establishing a render direction; and
means for utilizing the render direction to render the MIP image.

23. An apparatus for rendering a chessboard artifact free Maximum Intensity Projection (MIP) image, comprising:
means for accessing volumetric data, having random noise;
means for forming a discrete 3-D voxel grid from the volumetric data;
means for shooting a ray from individual pixels on an imam plane through the voxel grid;
means for sampling intensity values using chessboard mitigation algorithms along each ray with a defined step size;
means for computing a maximum sample intensity value of each ray;
means for storing the maximum intensity value in the pixel where the ray is cast; and
means for rendering an MIP image wherein the means for sampling intensity values using chessboard mitigation algorithms further comprises:
means for determining distances of sampling points from neighboring voxel grid points;
means for computing weighting coefficients as a function of the distances and chessboard mitigation factors so as to minimize differences in noise variance at different sampling positions; and
means for interpolating the intensity value at the sampling position as a function of the neighboring voxel intensity values and the weighting coefficients.

24. The apparatus as claimed in claim 23; wherein the means for computing weighting coefficients further comprises:
means for controlling the weighting coefficients by regional maximum and/or minimum intensity values.

25. The apparatus as claimed in claim 24, further comprising:
means for identifying a regional intensity value of each voxel.

26. The apparatus as claimed in claim 25, further comprising:
means for pre-processing the regional intensity value.

27. The apparatus as claimed in claim 26, further comprising:
means for utilizing an octree structure to store a minimum regional intensity value and a maximum regional intensity value.

28. The apparatus as claimed in claim 23; wherein the means for computing weighting coefficients further comprises:
means for controlling the weighting coefficients by a zoom factor $$W = \frac{W_0}{1 + zoomFactor \times M}$$

where, $W_0$ is the weighting function and M is a constant that controls the weighing function depending on the zoom factor.

29. The apparatus as claimed in claim 28, further comprising:
means for establishing the zoom factor.

30. The apparatus as claimed in claim 23, wherein the means for computing weighting coefficients further comprises:
means for controlling the weighting coefficients by the voxel sizes at each dimension.

31. The apparatus as claimed in claim 30, further comprising:
means for establishing a voxel dimension value for each voxel; and
means for utilizing the voxel dimension value to normalize the distance at each dimension before computing the weighting coefficients.

32. The apparatus as claimed in claim 23, wherein the means for computing weighting coefficients further comprises:
a low pass filter that performs low pass filtering of selected points that are within a predetermined distance of a grid point.

33. The apparatus as claimed in claim 32, wherein the low pass filtering is linear filtering.

34. The apparatus as claimed in claim 32, wherein the low pass filtering is non-linear filtering.

35. The apparatus as claimed in claim 23, wherein the means for computing weighting coefficients further comprises:
means for applying a localized high order interpolation kernel to at least a portion of the selected points.

36. The apparatus as claimed in claim 35, wherein the interpolation kernel comprises tri-cubic interpolation.

37. The apparatus as claimed in claim 23, wherein the means for computing weighting coefficients further comprises:
means for remapping the identified sample position distance from the voxel grid to maintain a minimum distance from each identified sample to the voxel grid, wherein the minimum distance exceeds a predetermined threshold.

38. The apparatus as claimed in claim 37, wherein the remapping further comprises:
linear distance mapping.

39. The apparatus as claimed in claim 37, wherein the remapping further comprises:
non-linear distance mapping.

40. The apparatus as claimed in claim 37, wherein the remapping further comprises:
threshold mapping.

41. A system for rendering a chessboard artifact free Maximum Intensity Projection (MIP) image, comprising:
one or more processors;
one or more memories, operatively coupled to the one or more processors, storing program code that cause the one or more processors to execute program code for:
accessing volumetric data, having random noise;
forming a discrete 3-D voxel grid from the volumetric data;
shooting a ray from individual pixels on an image plane through the voxel grid;
sampling intensity values using chessboard mitigation algorithms along each ray with a defined step size;
interpolating an intensity value at the sampling position as a function of the neighboring voxel intensity values and the weighting coefficients;
computing a maximum sample intensity value of each ray;
storing the maximum intensity value in the pixel where the ray is cast;
continuing the shooting, sampling, computing and storing steps until the pixels on the image plane are filled or rendered; and
rendering an MIP image.

42. The system as claimed in claim 41, wherein the step of sampling intensity values using chessboard mitigation algorithms further comprises:
determining distances of sampling points from neighboring voxel grid points;
computing weighting coefficients as a function of the distances and chessboard mitigation factors so as to minimize differences in noise variance at different sampling positions; and
interpolating the intensity value at the sampling position as a function of the neighboring voxel intensity values and the weighting coefficients.

43. The system as claimed in claim 42; wherein the step of computing weighting coefficients further comprises:
controlling the weighting coefficients by regional maximum and/or minimum intensity values.

44. The system as claimed in claim 43, further comprising program code for:
identifying a regional intensity value of each voxel.

45. The system as claimed in claim 44, further comprising program code for:
pre-processing the regional intensity value.

46. The system as claimed in claim 45, further comprising program code for:
utilizing an octree structure to store a minimum regional intensity value and a maximum regional intensity value.

47. The system as claimed in claim 42; wherein the step of computing weighting coefficients further comprises program code for:
controlling the weighting coefficients by the zoom factors $$W = \frac{W_0}{1 + zoomFactor \times M}$$

where, $W_0$ is the weighting function and M is a constant that controls the weighing function depending on the zoom factor.

48. The system as claimed in claim 47, further comprising program code for:
establishing a zoom factor.

49. The system as claimed in claim 42, wherein the step of computing weighting coefficients further comprises:
controlling the weighting coefficients by the voxel sizes at each dimension.

50. The system as claimed in claim 49, further comprising program code for:
establishing a voxel dimension value for each voxel; and
utilizing the voxel dimension value to normalize the distance at each dimension before computing the weighting coefficients.

51. The system as claimed in claim 42, wherein the step of computing weighting coefficients further comprises:
low pass filtering selected points that are within a predetermined distance of a grid point.

52. The system as claimed in claim 51, wherein the low pass filtering is linear filtering.

53. The system as claimed in claim 51, wherein the low pass filtering is non-linear filtering.

54. The system as claimed in claim 42, wherein the step of computing weighting coefficients further comprises:
   applying a localized high order interpolation kernel to at least a portion of the selected points.

55. The system as claimed in claim 54, wherein the interpolation kernel comprises tri-cubic interpolation.

56. The system as claimed in claim 42, wherein the step of computing weighting coefficients further comprises:
   remapping the distances of each identified sampling point from the voxel grid to maintain a minimum distance from each identified sampling point to the voxel grid,
   wherein the minimum distance exceeds a predetermined threshold.

57. The system as claimed in claim 47, wherein the remapping further comprises:
   linear distance mapping.

58. The system as claimed in claim 56, wherein the remapping further comprises:
   non-linear distance mapping.

59. The system as claimed in claim 56, wherein the remapping further comprises:
   threshold mapping.

60. The system according to claim 41, further comprising program code for:
   establishing a render direction; and
   utilizing the render direction in the rendering step.

* * * * *